US012577094B2

(12) United States Patent
Harzl et al.

(10) Patent No.: US 12,577,094 B2
(45) Date of Patent: Mar. 17, 2026

(54) HAND-HELD CAPPER/DECAPPER DEVICE AND METHOD

(71) Applicant: Azenta US, Inc., Burlington, MA (US)

(72) Inventors: Hans Harzl, Manchester (GB); Richard Laight, Lindley (GB); Sofia P. Maria, Didsbury (GB); Robert Gee, Preston (GB)

(73) Assignee: Azenta US, Inc., Burlington, MA (US)

( * ) Notice: Subject to any disclaimer, the term of this patent is extended or adjusted under 35 U.S.C. 154(b) by 176 days.

(21) Appl. No.: 18/258,546

(22) PCT Filed: Dec. 20, 2021

(86) PCT No.: PCT/US2021/073031
§ 371 (c)(1),
(2) Date: Jun. 20, 2023

(87) PCT Pub. No.: WO2022/140761
PCT Pub. Date: Jun. 30, 2022

(65) Prior Publication Data

US 2024/0300796 A1 Sep. 12, 2024

Related U.S. Application Data

(60) Provisional application No. 63/128,683, filed on Dec. 21, 2020.

(51) Int. Cl.
*B67B 7/18* (2006.01)
*B67B 3/20* (2006.01)

(52) U.S. Cl.
CPC ................ *B67B 7/182* (2013.01); *B67B 3/20* (2013.01)

(58) Field of Classification Search
CPC .... B65B 7/28; B67B 3/00; B67B 3/20; B67B 7/182

(Continued)

(56) References Cited

U.S. PATENT DOCUMENTS

| | | | |
|---|---|---|---|
| 4,519,276 | A | 5/1985 | Grabarski et al. |
| 7,845,149 | B2 | 12/2010 | Owen et al. |

(Continued)

FOREIGN PATENT DOCUMENTS

| | | | |
|---|---|---|---|
| CN | 207845100 | U | 9/2018 |
| CN | 111971247 | A | 11/2020 |

(Continued)

OTHER PUBLICATIONS

*U.S. Appl. No. 17/649,886, titled: Capping and De-Capping Apparatus and a Method of Operating Such an Apparatus, Date Filed: Feb. 3, 2022.

(Continued)

*Primary Examiner* — Katina N. Henson
(74) *Attorney, Agent, or Firm* — Hamilton, Brook, Smith & Reynolds, P.C.

(57) ABSTRACT

In a hand-held capper/decapper device, cap drivers in an array are driven by an array of rotary motors that drive the cap drivers in forward and reverse rotary directions to cap and decap caps from threaded receptacles. A common linear drive drives ejector pins through the centers of cap drivers to eject caps from the cap drivers. Single button operation is enabled by a controller that responds to press and release of a control button to alternate between decap and cap functions. The cap function finishes with ejection by extension of an ejector pin. An ejector button may also be provided for ejection without rotation of cap drivers. The cap drivers float against compression springs that apply axial force to the cap drivers. Ejection of the caps is staggered to reduce force required. Replaceable cap drivers designed to corresponded to cap designs are supported in a removable cartridge that is retained on a hand-held housing by magnets.

29 Claims, 23 Drawing Sheets

(58) Field of Classification Search
USPC ............ 81/3.09; 53/331, 317, 287, 471, 490
See application file for complete search history.

(56) References Cited

U.S. PATENT DOCUMENTS

| | | | |
|---|---|---|---|
| 8,196,375 | B2 | 6/2012 | Kohanski et al. |
| 8,978,517 | B2 | 3/2015 | Meyers et al. |
| 9,199,755 | B1 | 12/2015 | Cohen et al. |
| 9,878,890 | B2 | 1/2018 | Mikhailov |
| 10,214,404 | B2 | 2/2019 | Christensen et al. |
| 11,267,683 | B2 | 3/2022 | Hovendahl et al. |
| 2007/0095024 | A1 | 5/2007 | Neeper et al. |
| 2007/0107554 | A1 | 5/2007 | Yeager |
| 2014/0311090 | A1 | 10/2014 | Weber |
| 2015/0175398 | A1 | 6/2015 | Christensen et al. |
| 2017/0113909 | A1 | 4/2017 | Frey et al. |
| 2019/0375619 | A1 | 12/2019 | Hovendahl et al. |
| 2021/0147206 | A1 | 5/2021 | Sinnema et al. |

FOREIGN PATENT DOCUMENTS

| | | | |
|---|---|---|---|
| EP | 1 424 307 | A1 | 6/2004 |
| EP | 1 882 949 | A1 | 1/2008 |
| EP | 2 385 015 | A1 | 11/2011 |
| EP | 2 390 223 | | 11/2011 |
| EP | 2206676 | B1 | 4/2012 |
| EP | 2724976 | A2 | 4/2014 |
| GB | 2 010 789 | A | 7/1979 |
| JP | 54-130288 | A | 10/1979 |
| JP | 58129365 | A | 8/1983 |
| JP | 2005345177 | A | 12/2005 |
| JP | 2010100312 | A | 5/2010 |
| JP | 2011 162254 | | 8/2011 |
| JP | 2015525720 | A | 9/2015 |
| WO | WO 2003/034038 | A2 | 4/2003 |
| WO | WO 2010/006120 | | 1/2010 |
| WO | WO 2014/023683 | A2 | 2/2014 |
| WO | WO 2014/023683 | A3 | 2/2014 |
| WO | WO 2018/142361 | A1 | 8/2018 |
| WO | 2019/202078 | A1 | 10/2019 |

OTHER PUBLICATIONS

International Search Report and Written Opinion for Int'l Application No. PCT/IB2018/050705, Date of Mailing: May 11, 2018.

International Preliminary Report on Patentability for Int'l Application No. PCT/IB2018/050705, Date of Issuance: Aug. 6, 2019.

Non-Final Office Action for U.S. Appl. No. 16/483,294, 33 pages, Date Mailed: Jun. 4, 2021.

Notice of Allowance for U.S. Appl. No. 16/483,294, 10 pages, Date Mailed: Oct. 14, 2021.

*Christensen et al., "Test Tube Capping and De-Capping Apparatus", U.S. Appl. No. 16/286,118, filed Feb. 26, 2019.

Greiner Bio-One GhbH, Cryo.s™ 8-Channel Handheld Decapper, Instructions for Use, 12 pages (Jul. 2016).

Micronic, Capping & Decapping Range, Manual and Automated Equipment, 2 pages (2019).

Thomas Scientific, 8 Channel Decapper, Retrieved from Internet at: https://www.thomassci.com/scientific-supplies/8-Channel-Decapper, Retrieved from Internet on: Feb. 22, 2022, 2 pages.

Thermo Scientific 8-Channel Handheld Screw Cap Capper/Decapper, User Manual, 14 pages (No date available).

Thermo Scientific 8-Channel Screw Cap Decapper, Product Specifications, 2 pages (2010).

International Search Report and Written Opinion for Int'l Appl. No. PCT/US2021/073031, mailed Apr. 28, 2022.

ITL Announces 8 Channel Handheld Decapper Esy-Cap-8; 2008; https://web.archive.org/web/20080209112144/http://itl.co.uk/vitl/Esy-Cap.htm.

LifeTool announces 8 channel manual (handheld) decapper Recap-8m; 2007; https://web.archive.org/web/20080621143252/http://lifetool.co.uk/recap-8m.html.

Thermo Alto-8, mini benchtop 1D array decapper; 2008; https://web.archive.org/web/20080620061855/http://www.matrixtechcorp.com:80/storage-systems/product.aspx?id=87.

HAND-HELD CAPPER/DECAPPER DEVICE AND METHOD

RELATED APPLICATION

This application is the U.S. National Stage of International Application No. PCT/US2021/073031, filed on Dec. 20, 2021, which designates the U.S., published in English, which claims the benefit of U.S. Provisional Application No. 63/128,683, filed on Dec. 21, 2020. The entire teachings of the above applications are incorporated herein by reference.

BACKGROUND

Chemical analysis and processing is often carried out in sample tubes that may be capped and stored in arrays in racks of, for example, 16 to 96 tubes each. Historically, capping and decapping of tubes was accomplished individually by hand, but more recently, automated systems for capping and decapping entire arrays, or rows within an array, have been introduced. Yet another option is use of hand-held devices that cap and decap an entire row of an array.

SUMMARY

The manual process of decapping sample tubes, pipetting a sample from or to the tubes, and recapping the sample tubes is a very repetitive process. As such, there is a danger of repetitive strain injury. The disclosed hand-held capper/decapper device is intended to simplify capper/decapper operations and to minimize repetitive strain.

A hand-held capper/decapper device may comprise a housing configured to be held by hand against an array of threaded receptacles such as sample tubes. An array of cap drivers is supported by the housing, and the drivers are configured to engage and retain threaded caps. A motorized rotary drive drives the cap drivers in forward and reverse rotary directions to cap and decap the caps on and from the threaded receptacles. Ejector pins supported by the housing extend through the cap drivers. Motorized linear drive translates the ejector pins through the cap drivers to eject caps from the cap drivers. A motor controller controls the motorized rotary drive and the motorized linear drive in response to a control button on the housing. The controller is configured to control and alternate between a decap function and a cap function with each press of the control button. In the decap function, the motorized rotary drive drives the cap drivers in a reverse rotary direction to decap the threaded receptacles. In the cap function, the motorized rotary drive drives the cap drivers in a forward rotary direction to cap the threaded receptacles, and then the motorized linear drive translates the ejector pins through the cap drivers, to eject the caps from the cap drivers, and retracts the ejector pins. Thus, the device allows for single button operation.

The hand-held device may further include an eject button on the housing. The motor controller responds to press of the eject button to cause the motorized linear drive to drive the ejector pins through the cap drivers and to then retract the ejector pins. The controller then enters a state to perform the decap function with next press of the control button.

In the decap function, the motorized rotary drive may rotate in a forward direction to engage the cap drivers to the caps prior to driving the cap drivers in the reverse rotary direction.

The cap drivers may be supported in a cartridge that is removably attached to the housing. The cap drivers engage the ejector pins in order to be rotated by the motorized rotary drive through the ejector pins. The ejector pins may be driven in a single fixed stroke length, and the cap drivers in the cartridge may be of lengths that complement depths of cap recesses to control depth of stroke length within the caps. The cartridge may be retained on the housing by magnets.

The cap drivers may float vertically against compression springs. The motorized linear drive may be of fixed stroke length and the drive may engage one set of ejector pins prior to another set of ejector pins. The motorized rotary drive may comprise individual rotary motors, each coupled to an ejector pin, to drive the cap drivers through the ejector pins, and the motorized linear drive may comprise a common linear motor that translates all ejector pins.

In a method of using the device, cap drivers on a hand-held device are positioned against threaded receptacles. With a single button on the hand-held device, motorized rotary drive of the cap drivers and motorized linear drive of ejector pins is controlled by the motor controller. The controller alternates between decap and cap functions, and controls each function, with each press of the control button.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1A:
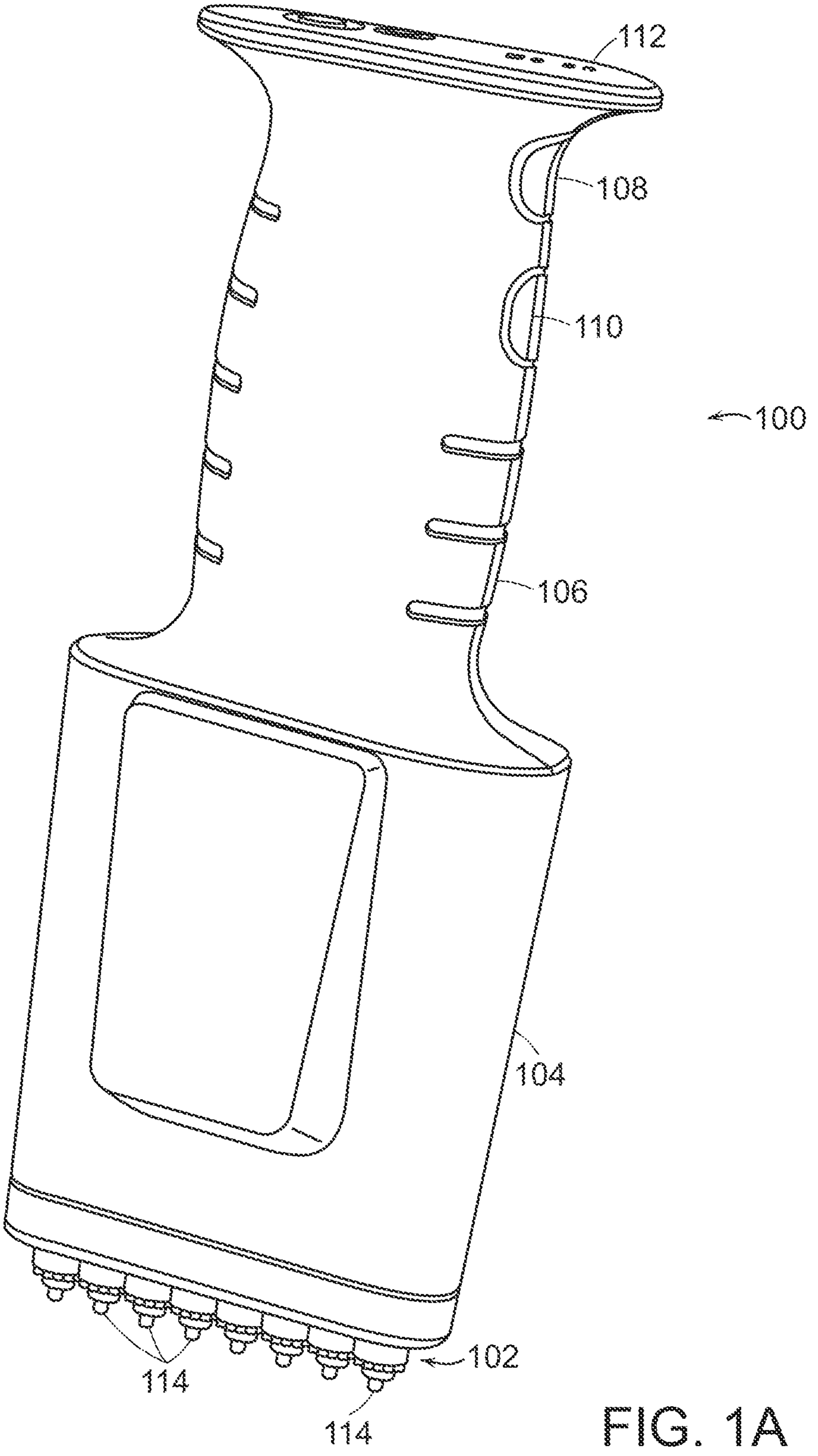
FIG. 1A is a perspective view of a hand-held capper/decapper embodying the invention.
Figure 1B:
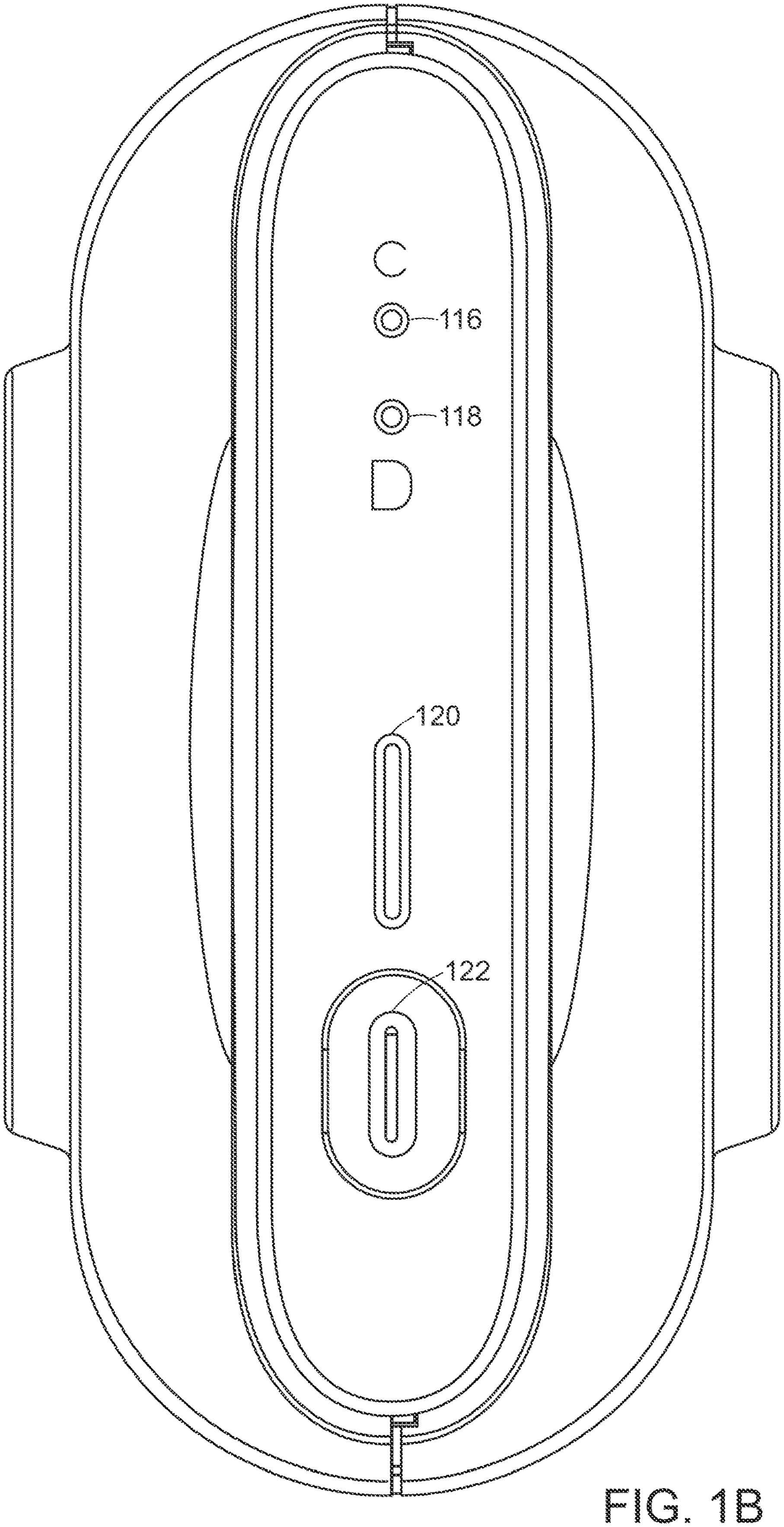
FIG. 1B is a view of the top end of the hand-held device of FIG. 1A.

FIG. 1A illustrates a hand-held capper/decapper having eight cap drivers 102 extending from one end of a housing 104 and a handle 106 at the opposite end of the housing. Other numbers of cap drivers may be provided but eight is best suited to most applications. Control of the capper/decapper operation can be performed with a single control (action) button 108, but an additional eject button 110 may also be included. The capping (C) or decapping (D) state of the device can be determined from LED indicators 116 and 118, respectively, at the top end of the device 112 (FIG. 1B). Also shown are a battery level indicator 120 and a charging port 122. Ejector pins 114 extend through the drivers 102 for ejecting caps or capped tubes from the device.

Figure 2:
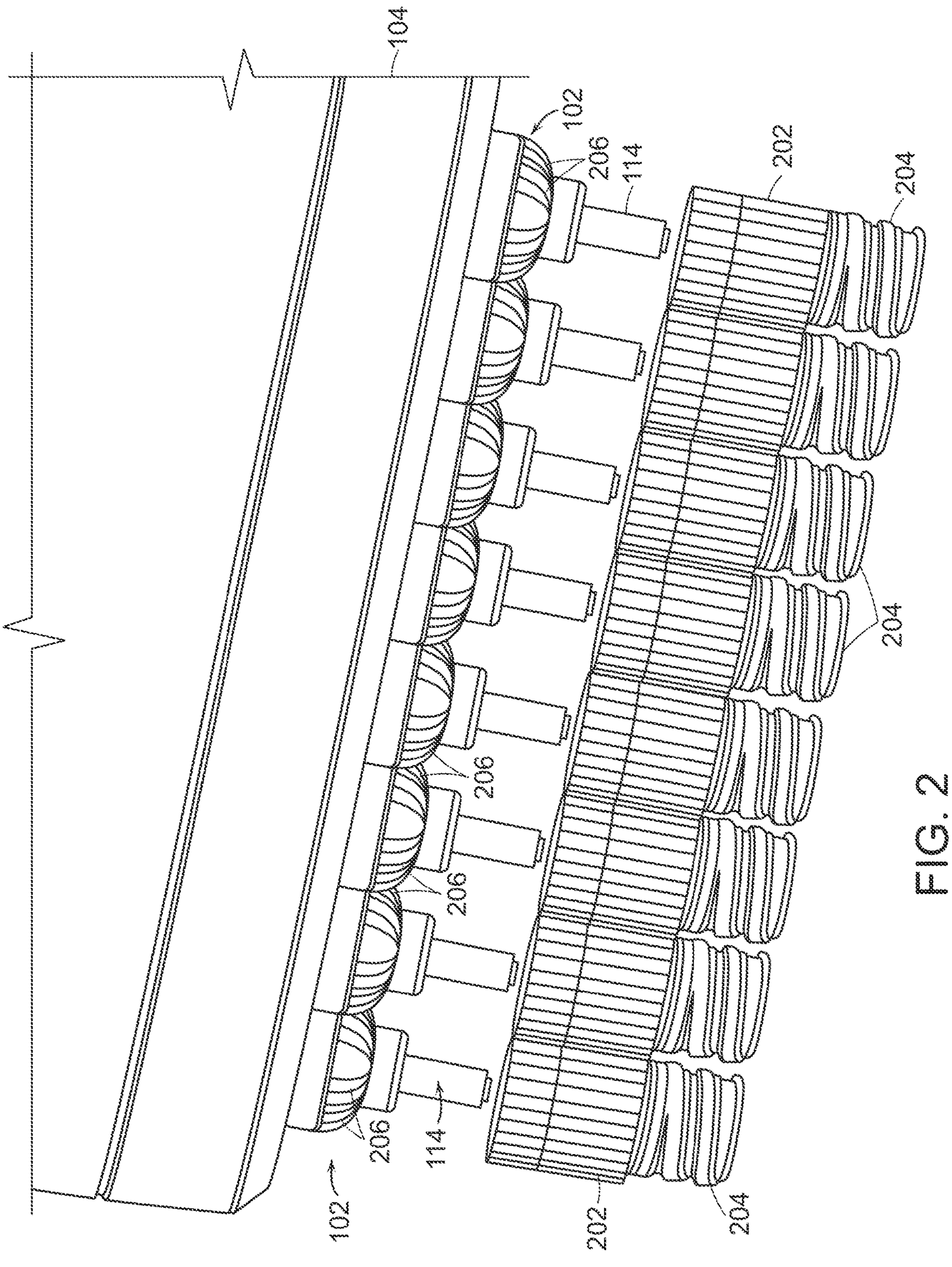
FIG. 2 illustrates the cap drivers and the ejector pins at the end of the hand-held device being inserted into an array of caps.
Figure 3:
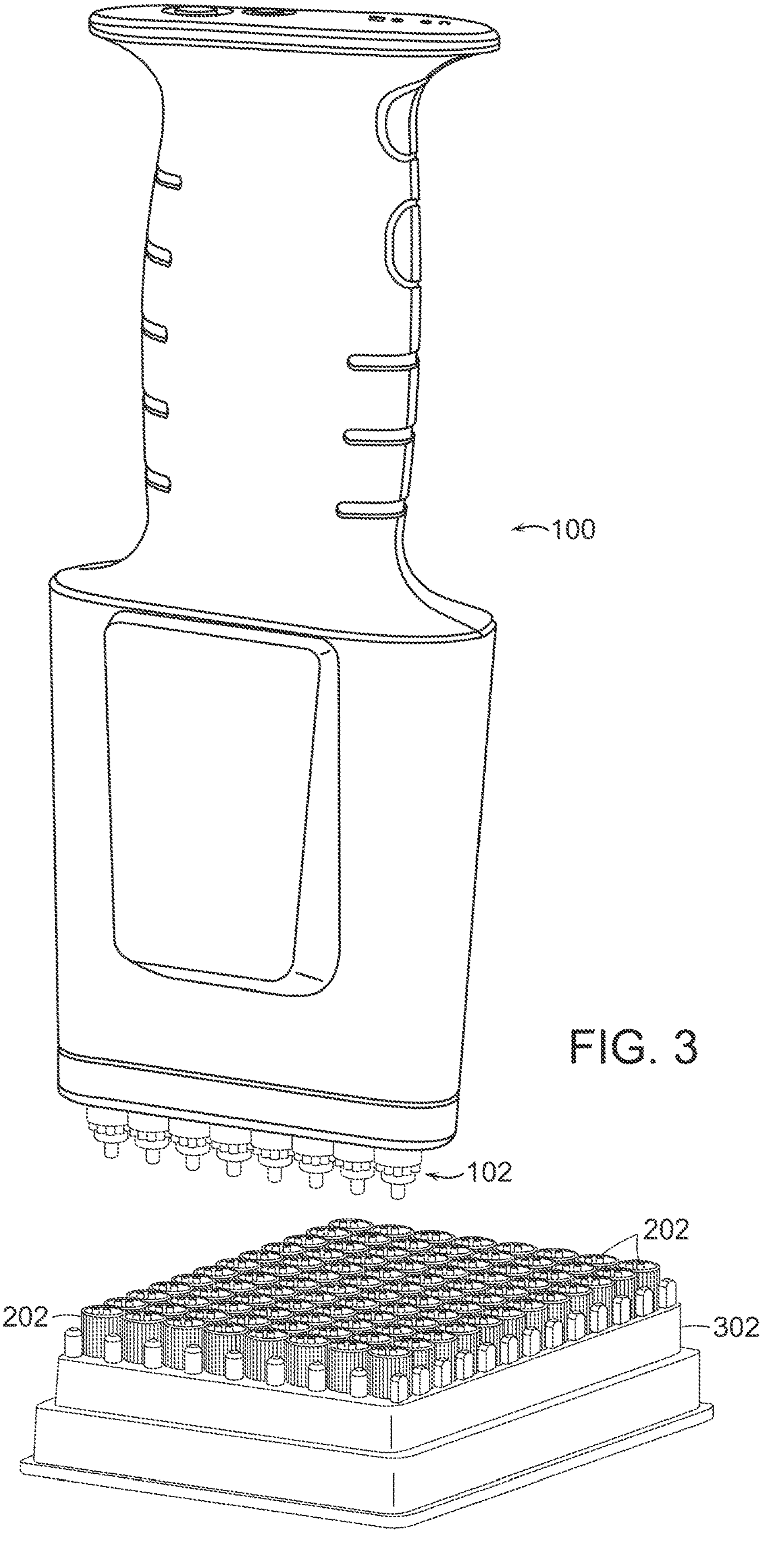
FIG. 3 illustrates alignment of the hand-held device of FIG. 1A with a row of caps stored in a cap rack.

In operation, as illustrated in FIG. 2, the cap drivers with ejector pins are aligned with a row of caps 202 having threaded portions 204 to be threaded into complementary threads of sample tubes or other receptacles. The caps may be in a rack of caps ready for use or they may be on capped sample tubes prior to a decapping operation. In either case, the hand-held device is aligned with the caps and set against the caps. FIG. 3 shows a hand-held device 100 being aligned with a row of caps 202 on a rack 302.

Figure 4:
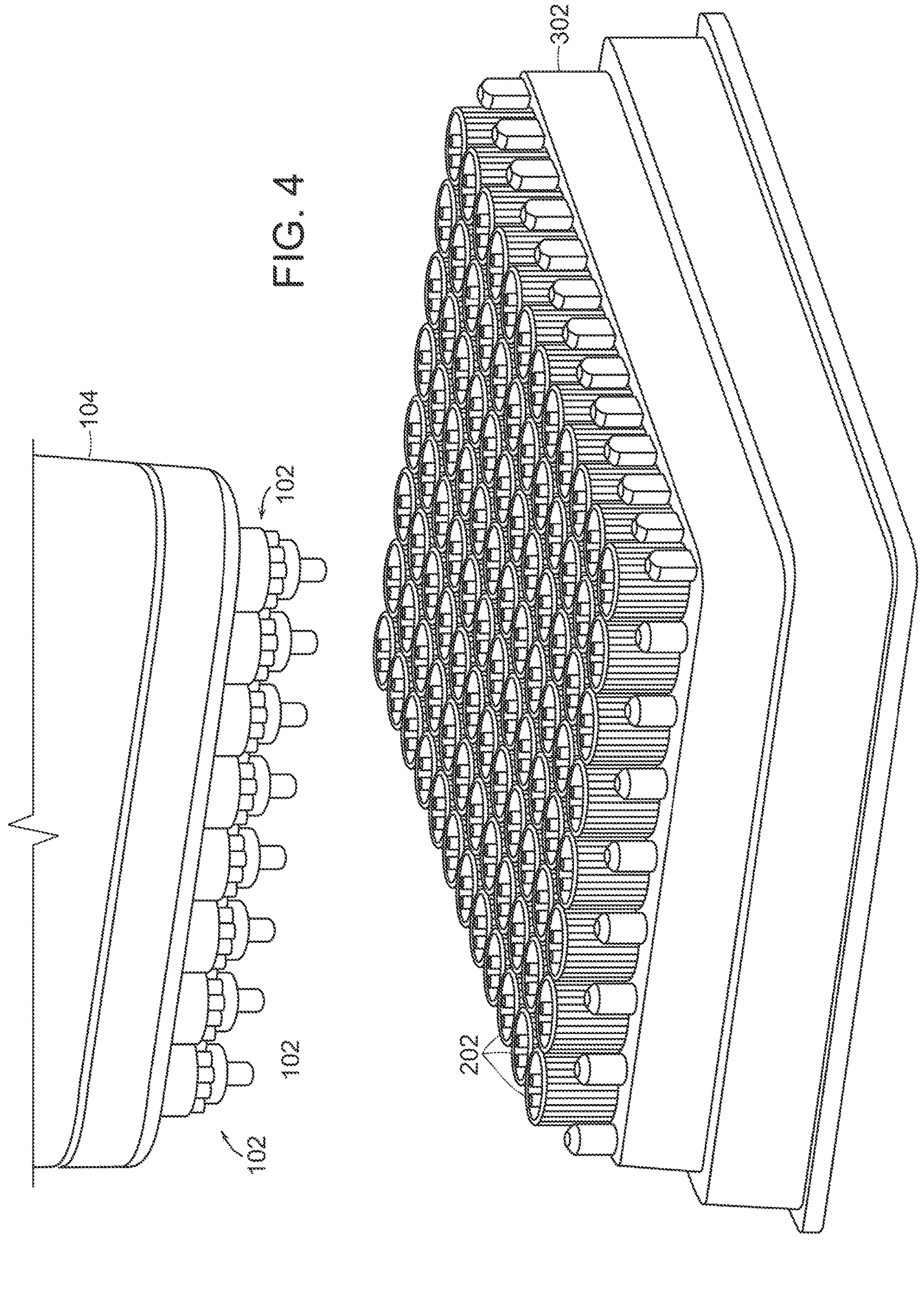
FIG. 4 is an enlarged view of the cap drivers being aligned with a row of caps in a rack.

FIG. 4 is an enlarged view of the end of the housing 104 with cap drivers 102 being aligned with a row of caps 202 on the rack 302.

Figure 5:
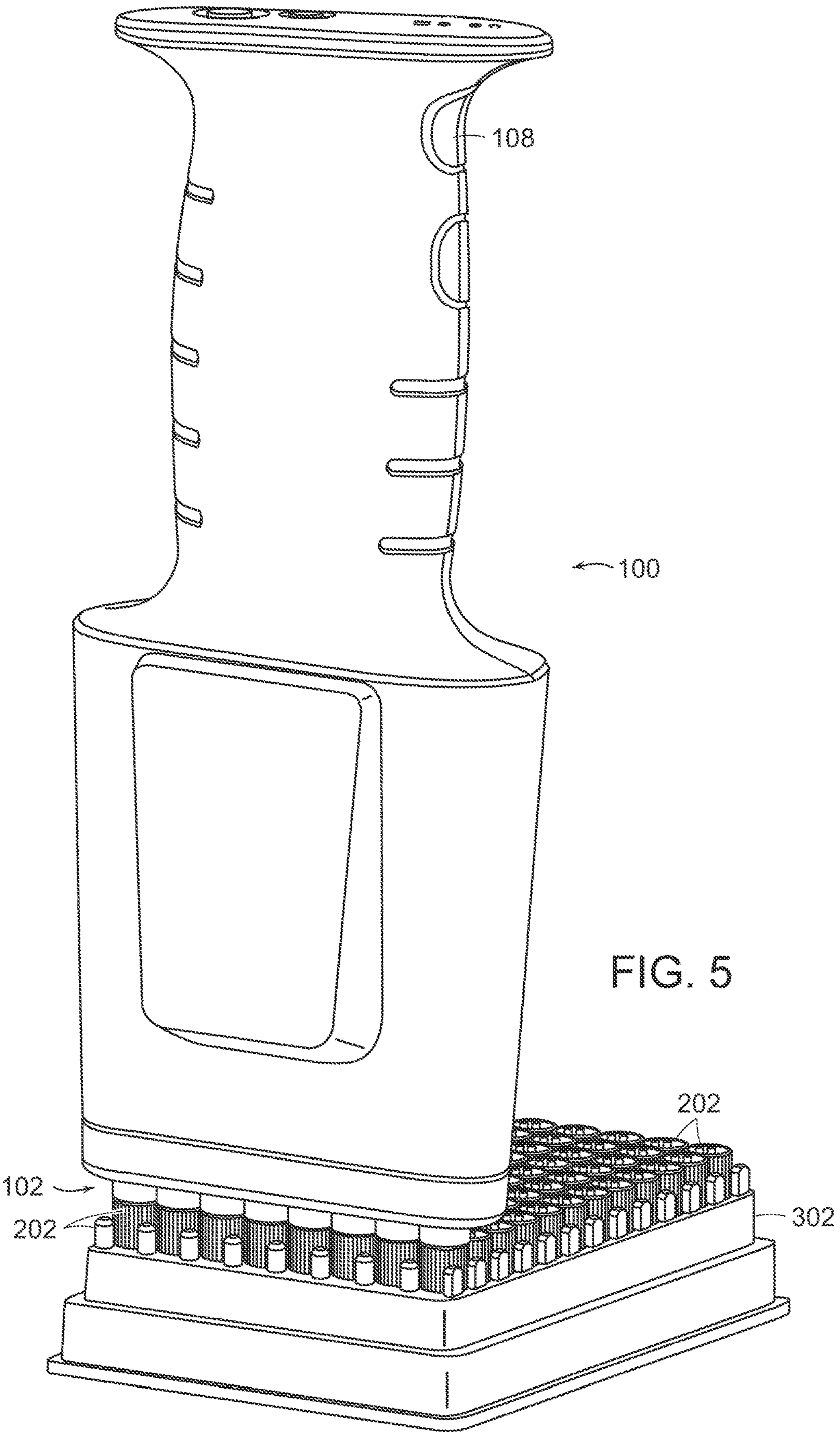
FIG. 5 illustrates the cap drivers of the hand-held device against a row of caps in a cap rack.

In FIG. 5, a device 100 is set against a row of caps 202 with the cap drivers 102 pressed against the caps. To engage the caps, the control button 108 is pressed and released to initiate the decap process. The device 100 then automatically rotates the cap drivers briefly in a clockwise direction to align the cap driver features 206 with spaces between features in the cap recesses, allowing the cap drivers to be pressed by spring force into the recesses with light friction fit. Thereafter, in a common sequence for both picking up caps from a rack and decapping, the cap drivers are rotated in a counterclockwise direction. That counterclockwise rotation may not be required when removing the caps from a rack of caps if the rack is not threaded, but it is performed to simplify programming of the device as discussed below.

Figure 6:
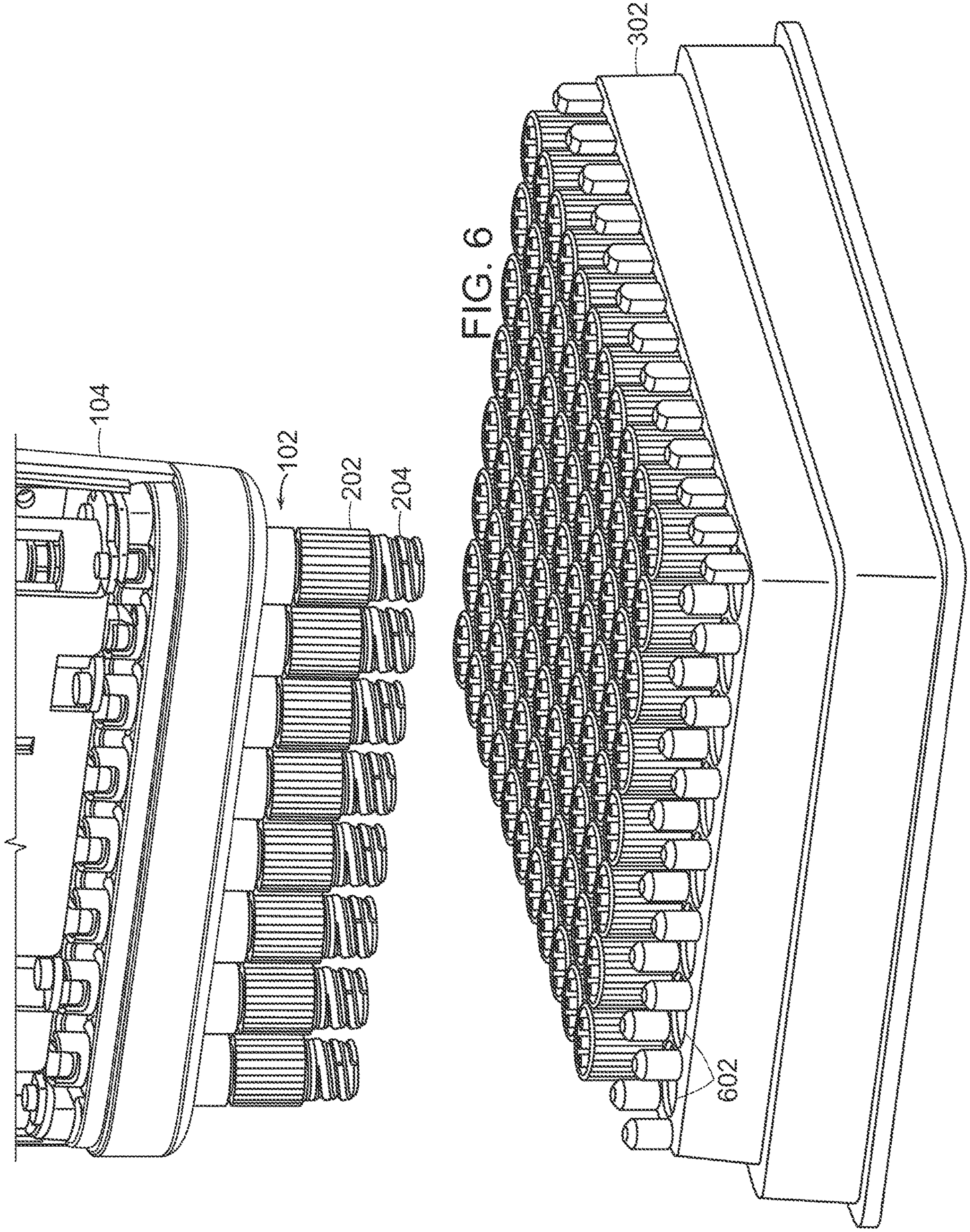
FIG. 6 illustrates the row of caps engaged by the cap drivers of the hand-held device after removal of the caps from the cap tray.
Figure 7:
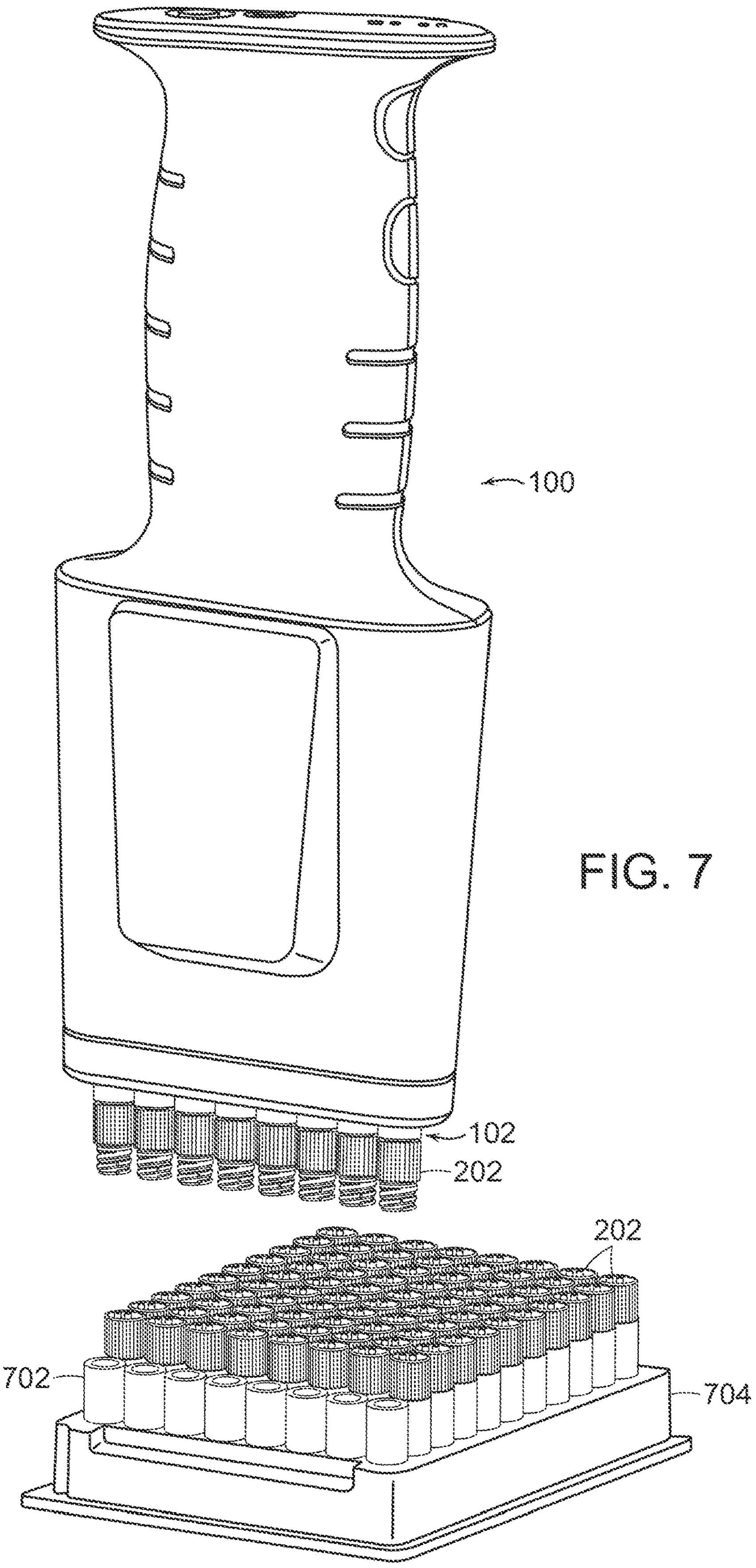
FIG. 7 illustrates the caps retained by the cap drivers of the hand-held device being aligned with a row of tubes that are to be capped.

In FIG. 6, the caps 202 are shown retained by the cap drivers 102 at the end of the housing 104. A panel of the housing is removed to show the interior of the device to be discussed below. As shown, the row of ports 602 of the rack 302 are left empty FIG. 7 shows the device 100 being aligned with a row of uncapped sample tubes 702 in a rack 704 in preparation for capping the tubes with the row of caps 202.

Figure 8A:
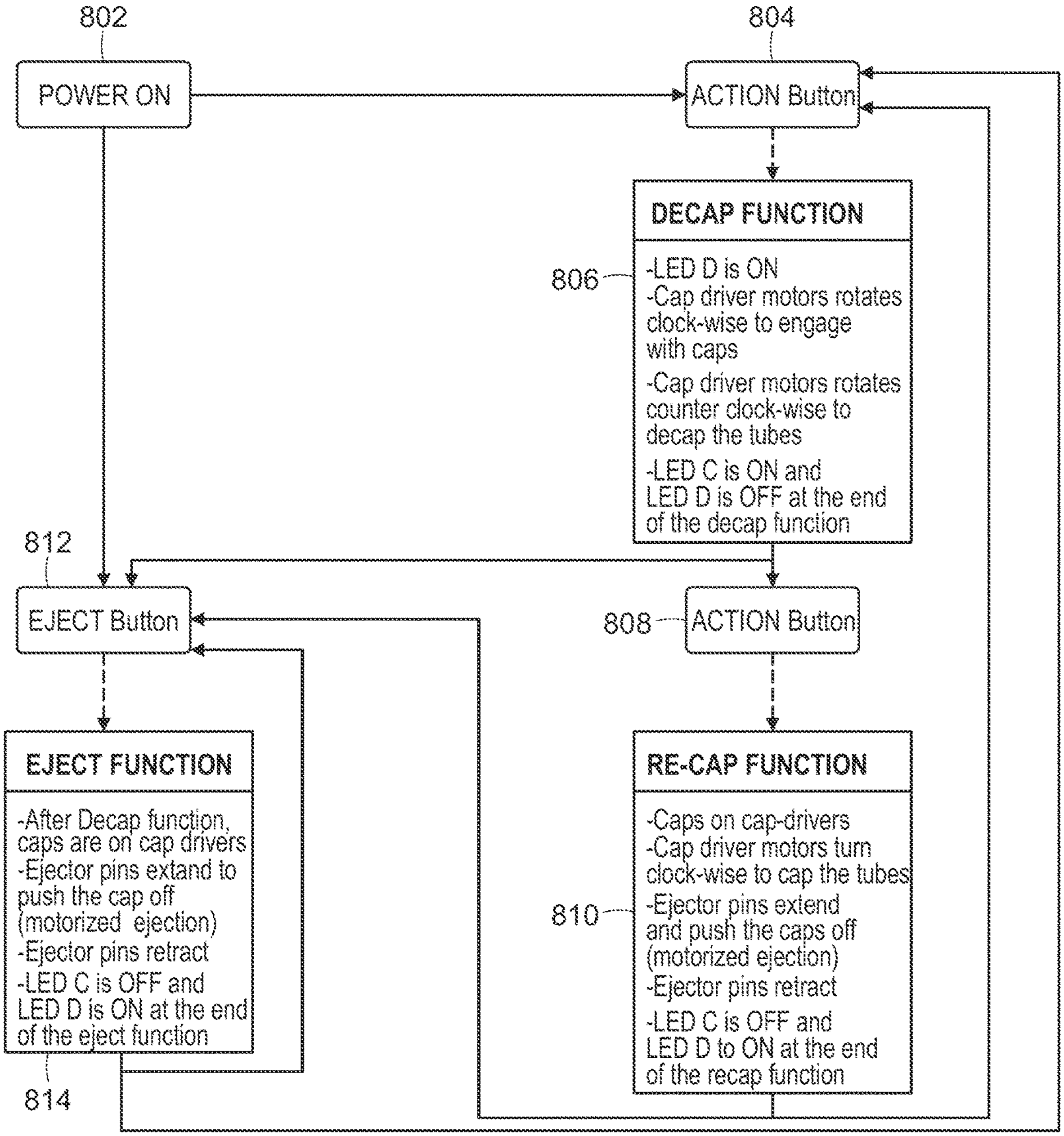
FIG. 8A is a flowchart of operation of the controller of the hand-held device.

FIG. 8A is a flowchart of programmed operation of the electronic controller, which is likely a microprocessor, within the device 100. The device need only perform two primary functions: decapping and capping (including recapping) sample containers. Two secondary functions, picking up caps from a rack and ejecting caps such as into a waste bin, can be performed by decapping and capping functions, respectively. All four operations can be performed by pressing the single control button 108 once for each of successive operations. With single button control, the eject function is performed using the recap function, which itself includes an eject of the capped tube. However, a second button 110 may be provided solely for eject where it is preferred that the cap drivers not be rotated during the eject function.

After the device is powered on at 802, the LED (D) at the end of the device 112 is lit. When the action button 108 is first pressed and released at 804, the device enters the decap function 806. Individual cap driver motors are rotated clockwise to align the features 206 with spaces between features in cap recesses so that the cap drivers 102 may press into the cap recesses under spring force to be described below. Because of different orientations of the caps, the cap drivers will be pressed into respective caps at different times. The cap driver motors then rotate counterclockwise to decap the tubes or to remove the caps from the cap tray. The LED (C) is turned on and the LED (D) is turned off at the end of the decap function to indicate that the device is prepared for a capping (recap) function.

The device can be set in the recap function after decap because only one of two functions will occur with the caps retained on the cap drivers: either recap to place the caps back on the sample tubes or eject to dispose of the caps. As noted above, because the recap function 808 includes an eject step after the caps are threaded onto the sample tubes, the recap function can serve the eject function, albeit with an unnecessary rotary drive of the cap drivers. Alternatively, while the device is in the C mode ready for capping, the eject button can be pressed, and ejection at 814 is followed by return to the D mode.

In capping (recapping) tubes, the caps already retained on the cap drivers are pressed against the sample tubes. The action button 108 is pressed at 808 and released. In the recap function 810, each cap driver motor is turned clockwise to free the features 206 and allow the cap drivers 102 to be set into the cap recesses, and to then thread the caps onto the tubes. Because the threads on the caps and the sample tubes may be in different orientations, the caps will likely be completely threaded onto the sample tubes at different times. To account for those different times, the individual motors that drive the cap drivers stall out when a proper capping torque is reached.

The caps are friction fit to the cap drivers. To remove the device from the caps on the capped sample tubes without requiring the user to apply a pulling force, the ejector pins are extended to push the individual cap drivers off of the caps and thus off of the capped tubes. The ejector pins are then retracted for the next decapping operation, and the LED (C) is turned off as the LED (D) is turned on to complete the recap function.

With the cap drivers now free of any caps, the next operation will require that a cap be picked up, either from a cap tray or from a row of capped sample tubes. As noted, the decap function is used for removing caps from a cap tray, so the device is properly placed in the decap mode (D), prepared for the decap function when the action button is again pressed.

When the eject button 110 is pressed at 812, the device would likely have just completed the decap function and have caps retained on the cap drivers, but it may be pressed after power on, after the decap function, after the recap function, or even after a prior eject function. After following the decap function, caps retained on the device are ejected. After the other functions, the device harmlessly proceeds through the eject function 814. In the eject function 814, the ejector pins are extended under motor control to push caps off of the cap drivers. In this motorized ejection, the user need not provide any force other than pressing and releasing the eject button. After the motorized ejection, the ejector pins are retracted, the LED (C) is turned off and the LED (D) is turned on to indicate that the device is free of caps and ready for the decap function.

With a motorized rotation of the cap drivers and motorized linear drive of the ejector pins, simple one button operation with little physical input by the user is possible. The optional eject button allows for the eject function without rotation of the cap drivers, thus saving power and time.

Figure 8B:
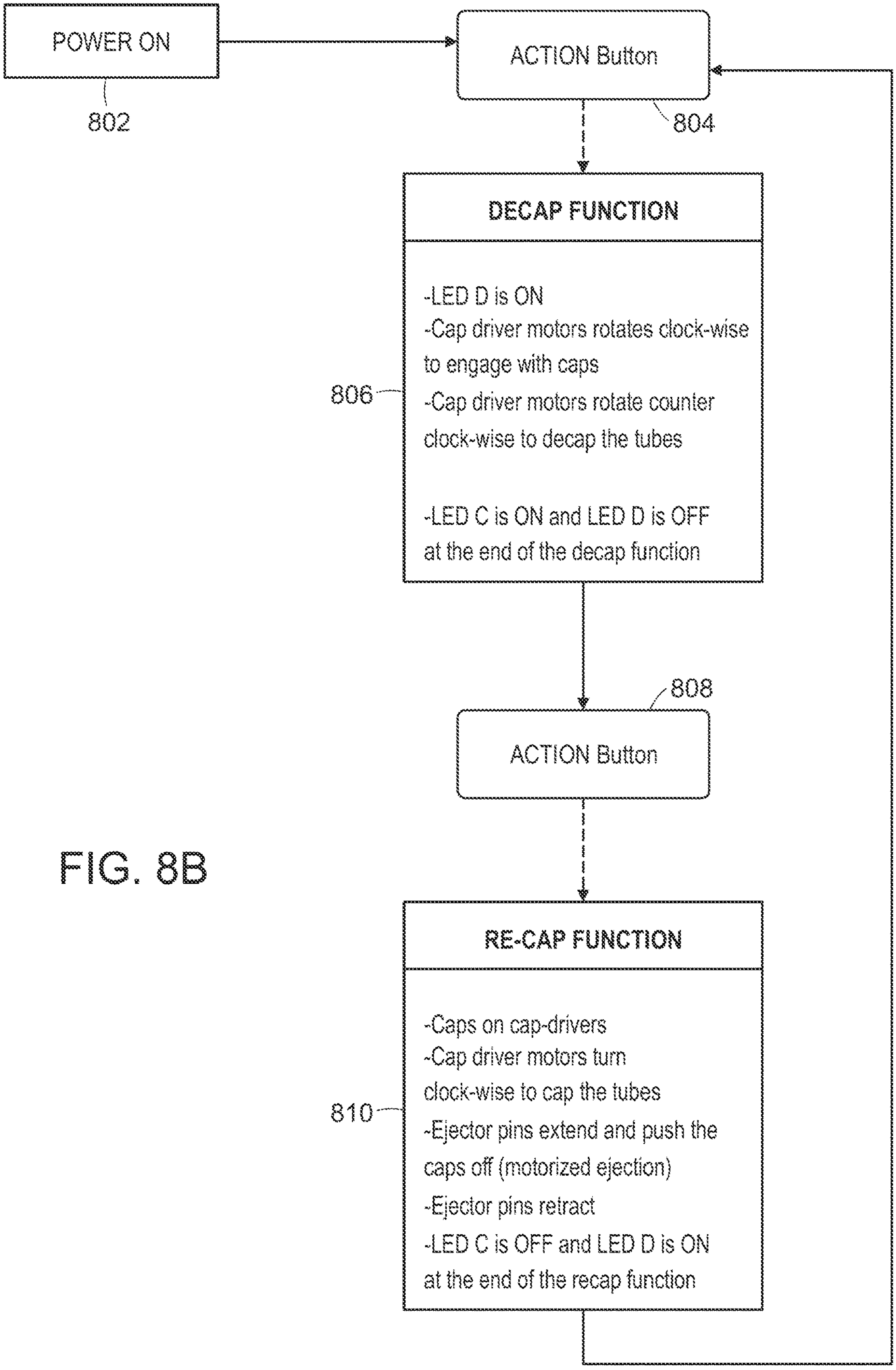
FIG. 8B is a flowchart for an alternative embodiment without the eject button.

FIG. 8B is a flow chart of device operation where an eject button is not included. The decap function 806 and recap function 810 are identical to those of FIG. 8A. The eject function is eliminated. As previously noted, that function can instead be performed by the recap function 810.

The internal structure and operation of the device 100 will now be described.

Figure 9:
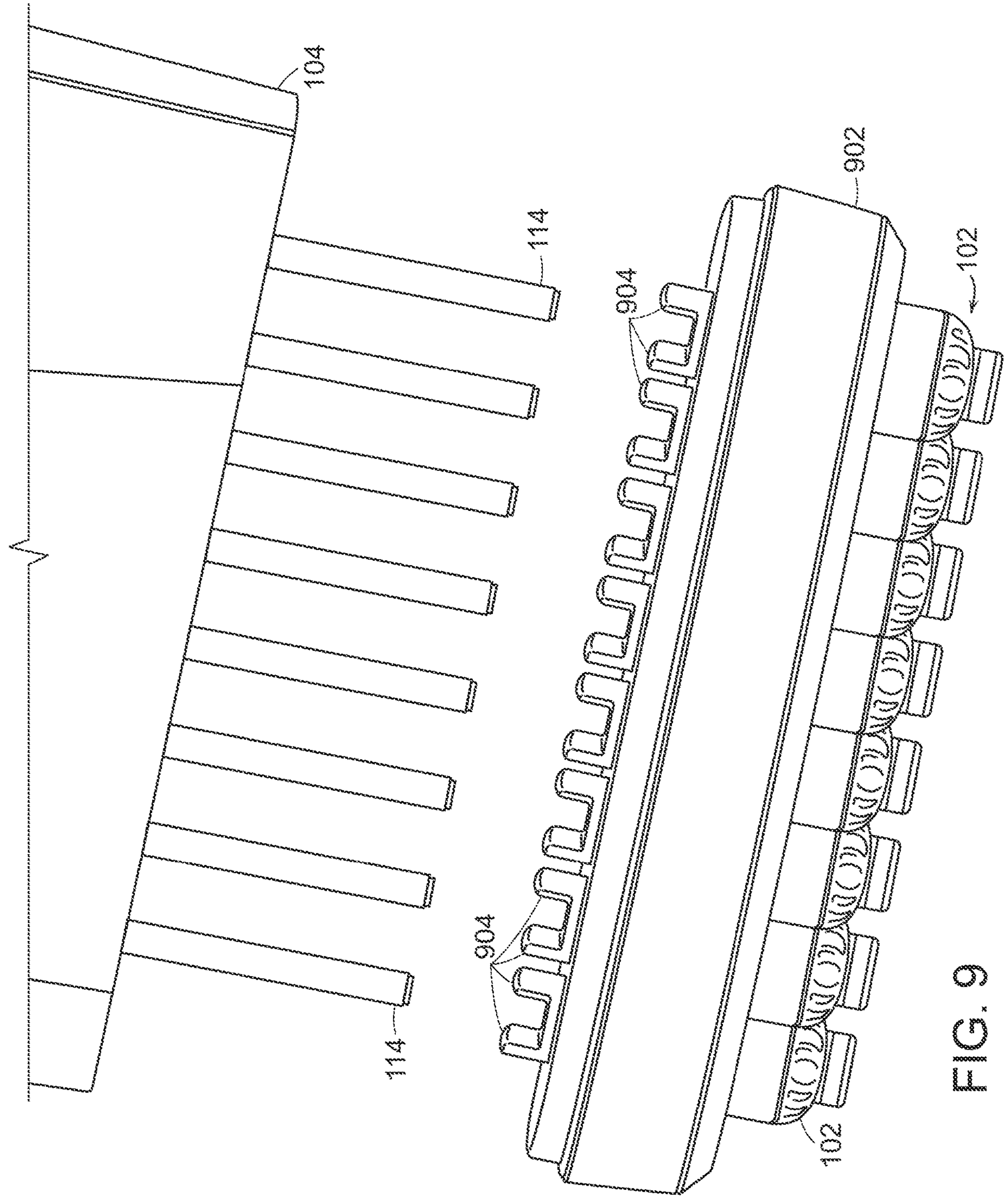
FIG. 9 illustrates a cap carrier cartridge removed from the hand-held device.

To allow for ready use with different styles of caps, the eight cap drivers 102 are supported in a cap driver cartridge 902 of FIG. 9 and are replaceable within that cartridge. The cap drivers 102 include splines 904 at their upper ends and the cap drives are rotated by drive hubs 1002 (FIG. 10) that protrude from the housing 104 and that fit between the splines. To mate the cartridge 902 to the housing 104, the cartridge is moved toward the housing 104 over the ejector pins 114. The ejector pins pass through center holes that extend the lengths of the drivers 102 within the cartridge 902.

Figure 10:
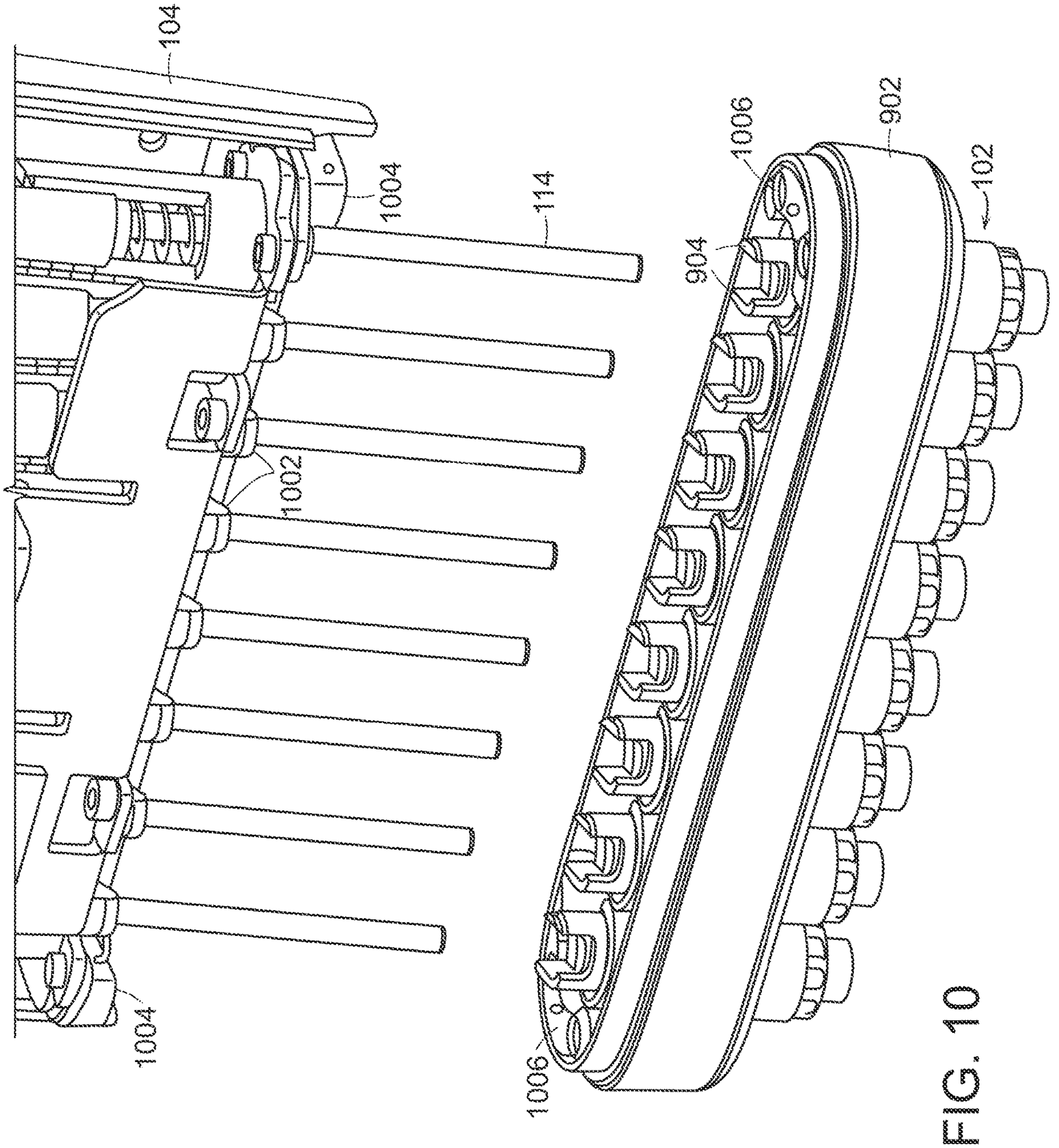
FIG. 10 is a perspective view of the cap driver cartridge removed from the hand-held device.

FIG. 10 shows a side panel removed from the housing 104 to show the drive hubs 1002 that fit into the splines 904 of the cap drivers 102. The ejector pins 114 extend through and are able to translate through the hubs. When the cartridge 902 is fully displaced upward against the base of the housing 104, it is retained there by magnets 1004 attracting retention plates 1006 at either end of the cartridge. Thus, the cartridge 902 can be easily removed from the housing 104 by simply pulling it away with sufficient force to overcome the strength of the magnets, and a new cartridge with a different style of caps drives can be readily installed. The cap drivers in the cartridge may also be replaced as described below to allow a cartridge to be adapted to different cap styles.

Figure 11:
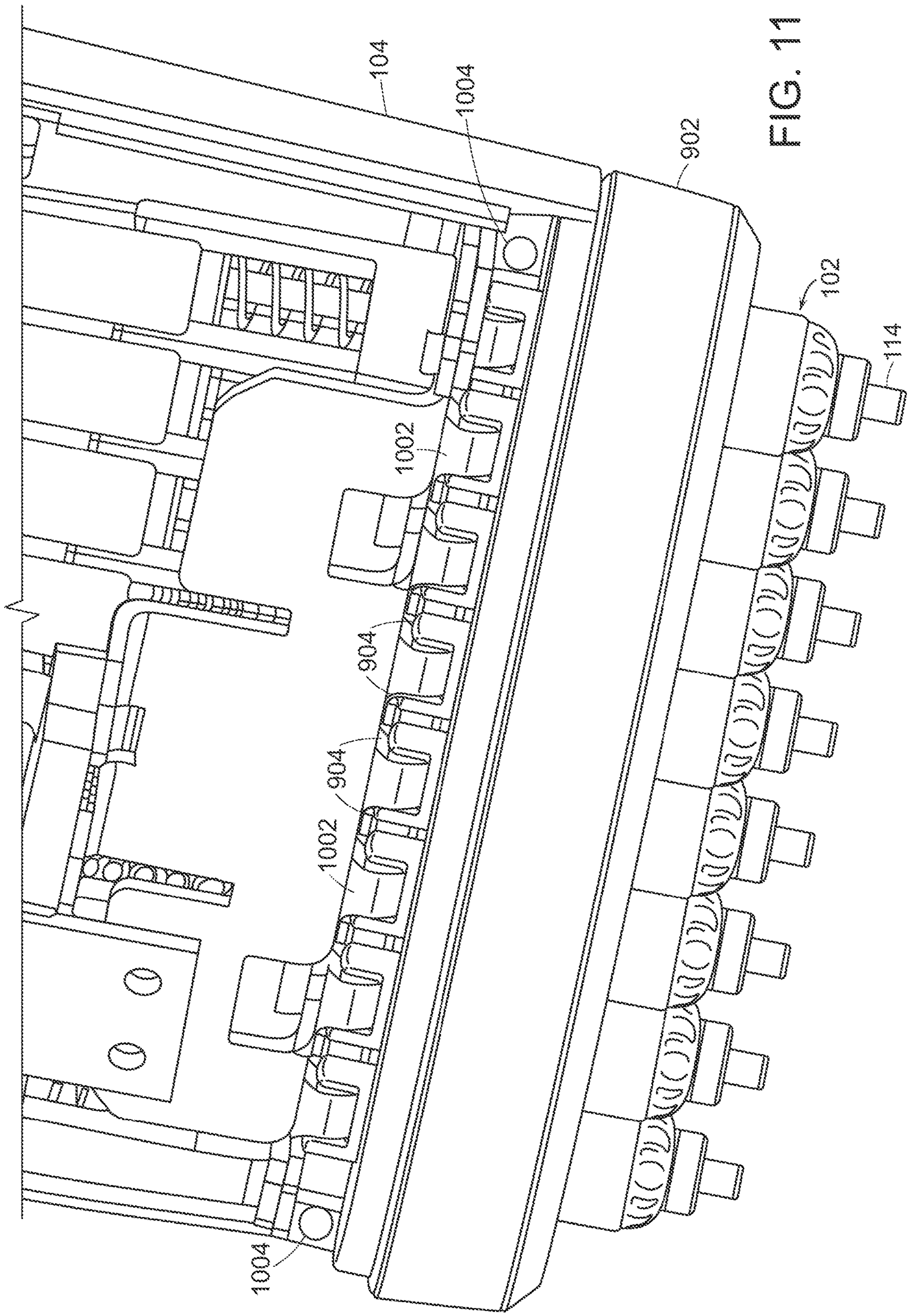
FIG. 11 is a side view of the cartridge installed on the hand-held device with a side panel of the device removed.

In FIG. 11, the cartridge 902 is retained by the magnets against the base of the housing 104. In this position, the ejector pins 114 extend completely through the cap drivers 102 and the cap driver splines 904 are positioned to either side of respective drive hubs 1002.

Figure 12A:
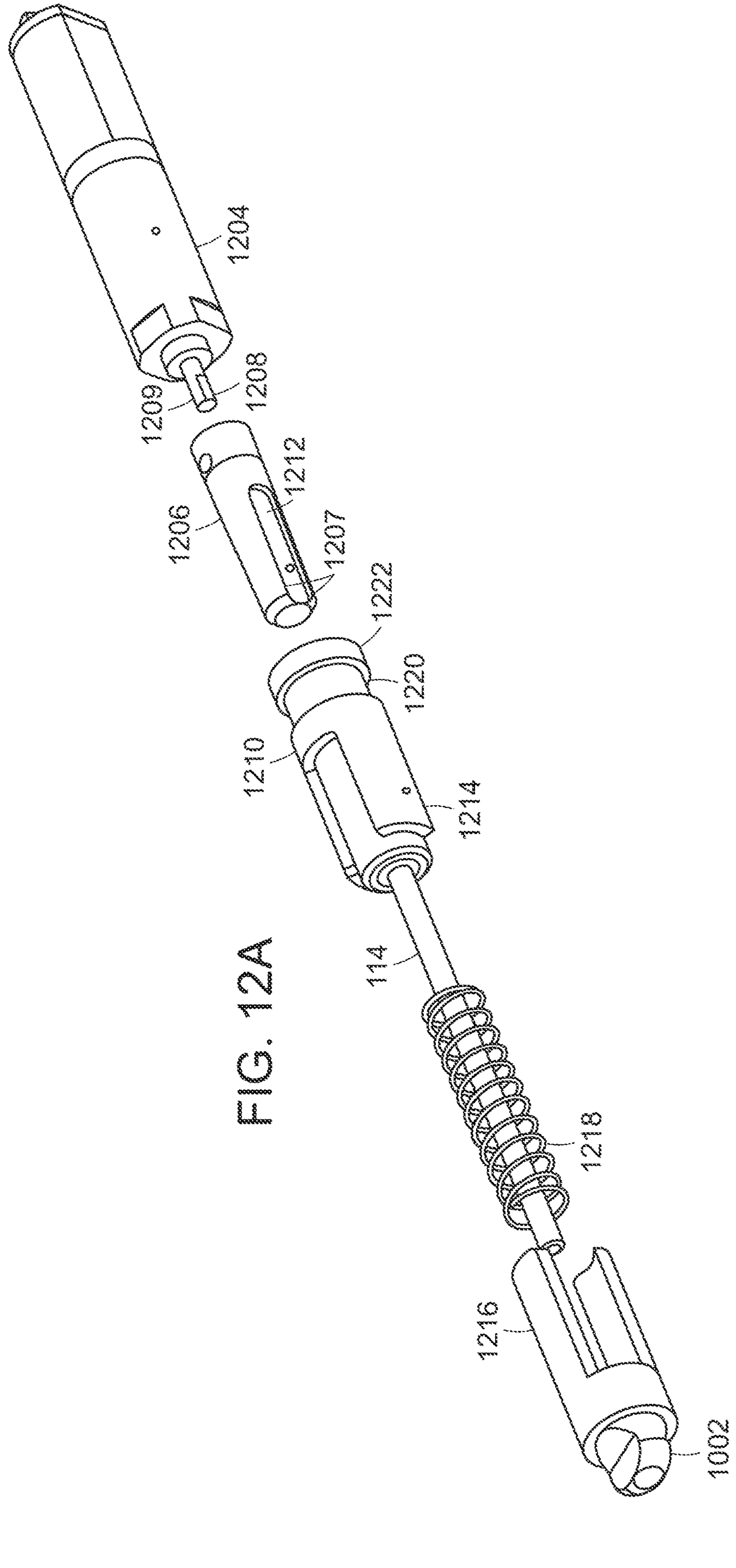
FIG. 12A is an exploded view of the motorized rotary drive of FIG. 12B, both in perspective.
Figure 12B:
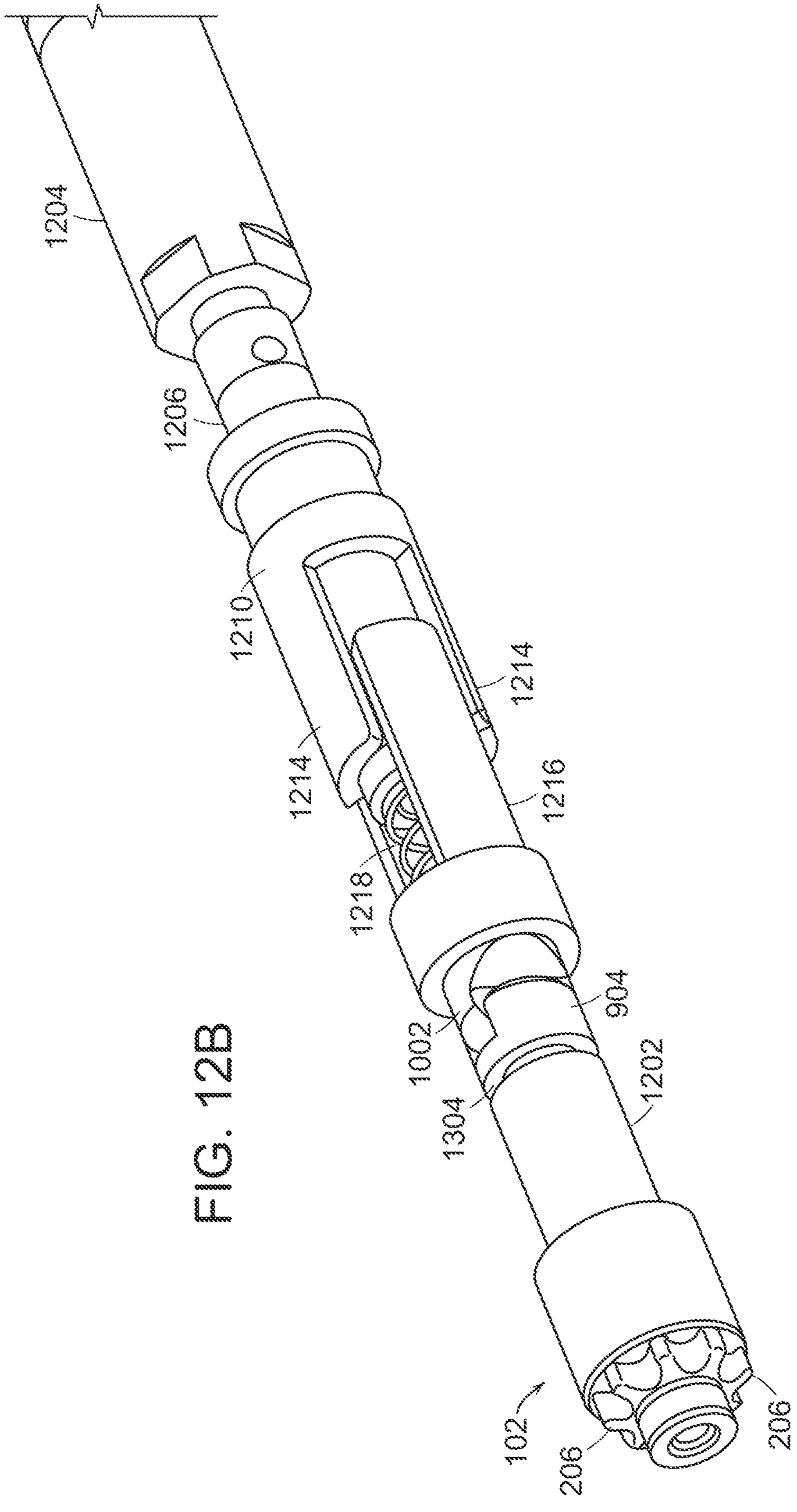

FIG. 12B illustrates a motorized rotary drive to drive hub 1002 that drives an individual cap driver 102. As illustrated in FIG. 11, the drive hub 1002 is set within a pair of splines 904 of the cap driver. Not shown in FIG. 11 was the cap driver drive shaft 1202 that extends through the cartridge 902. FIG. 12A is an exploded view of the motorized rotary drive down to the hub 1002. In each drive, the ejector pin 114 is rotated by an individual DC motor with gearhead 1204 through a drivetrain that enables the ejector pin to, in turn, rotate the hub 1002. Axial movement of the ejector pin 114 through the cap driver is also provided for, and the motorized linear drive of the ejector pin is described below.

A feature (not shown) within a center hole in a torque spline 1206 keys onto a flat 1208 on a drive axle 1209 of the DC motor 1204. The torque spline in turn is keyed to a feature (not shown) within the center hole of the ejector hub 1210. The splines 1207 on either side of groove 1212 allow ejector hub 1210 to be rotated while also allowing the hub 1210 to be moved axially along the splines 1206. At its upper end, the ejector pin hub 1210 has a circumferential groove 1220 that defines a flange 1222, features to be explained with respect to linear drive in FIGS. 15, 17, 18A and 18B. Splines 1214 of the ejector pin hub 1210 mate with splines 1216 fixed to the drive hub 1002 to cause the drive hub 1002 to be rotated by the ejector hub 1210 while permitting axial translation of the ejector pin through the drive hub. In the assembly of FIG. 12B, the ejector pin extends through the drive hub 1002, and the spline 1216 compresses the compression spring 1218 against the ejector pin hub 1210. The spring 1218 applies pressure through the drive hub 1002 to the cap driver 102 to press it into a cap as described below.

Figure 13:
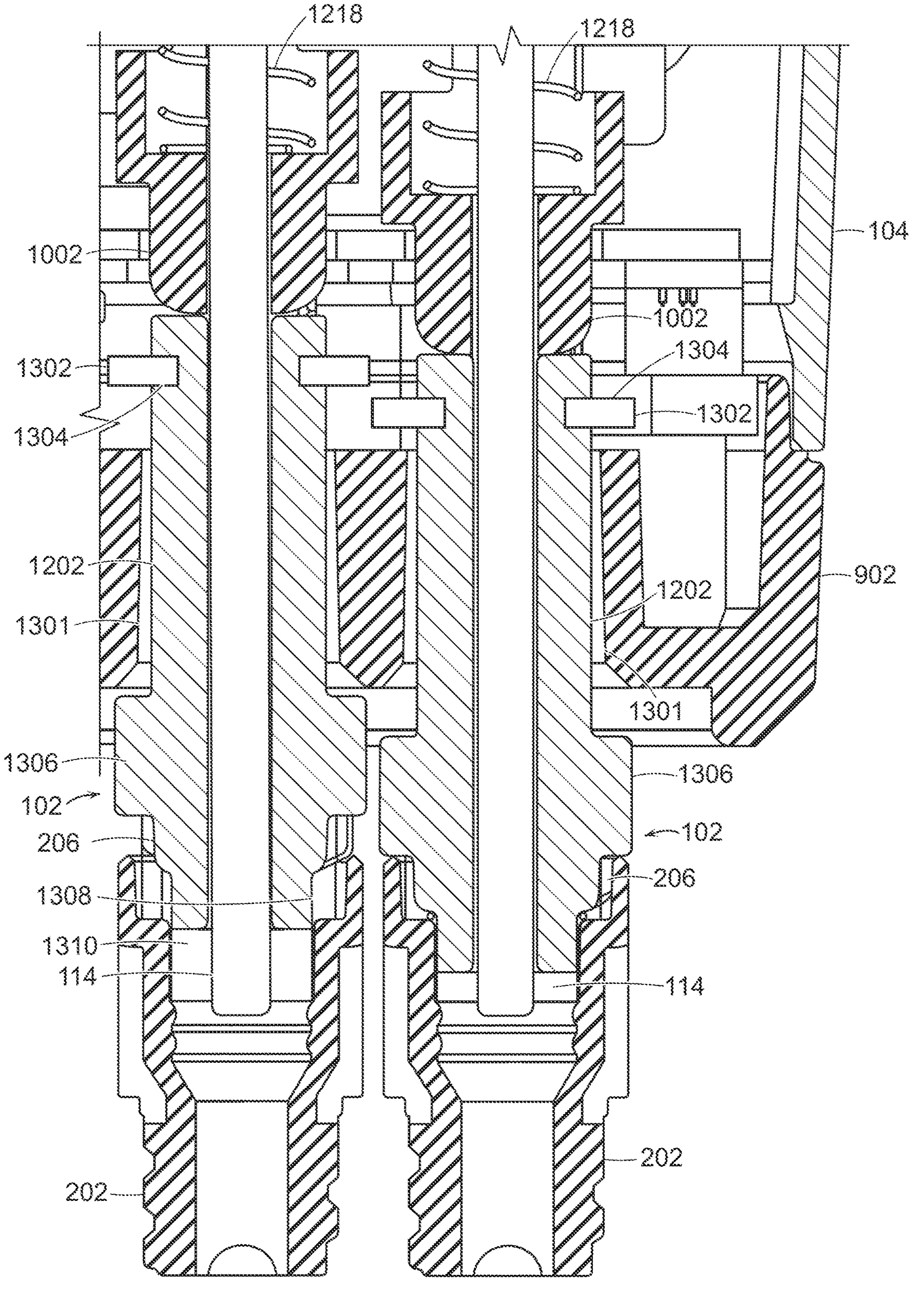
FIG. 13 a cross-sectional view of adjacent cap drivers and associated caps at different stages of engagement of the cap drivers with the caps.

FIG. 13 illustrates the lower ends of two of the drivetrains of FIG. 12B retained in the cartridge 902 and pressed against caps 202. The cap driver drive shafts 1202 extend through ports 1301 in the cartridge 902. They are free to move up and down in the cartridge ports, restricted only by the flange 1306 at the lower end and the C-clip 1302 set in a groove 1304 at the upper end.

Figure 14:
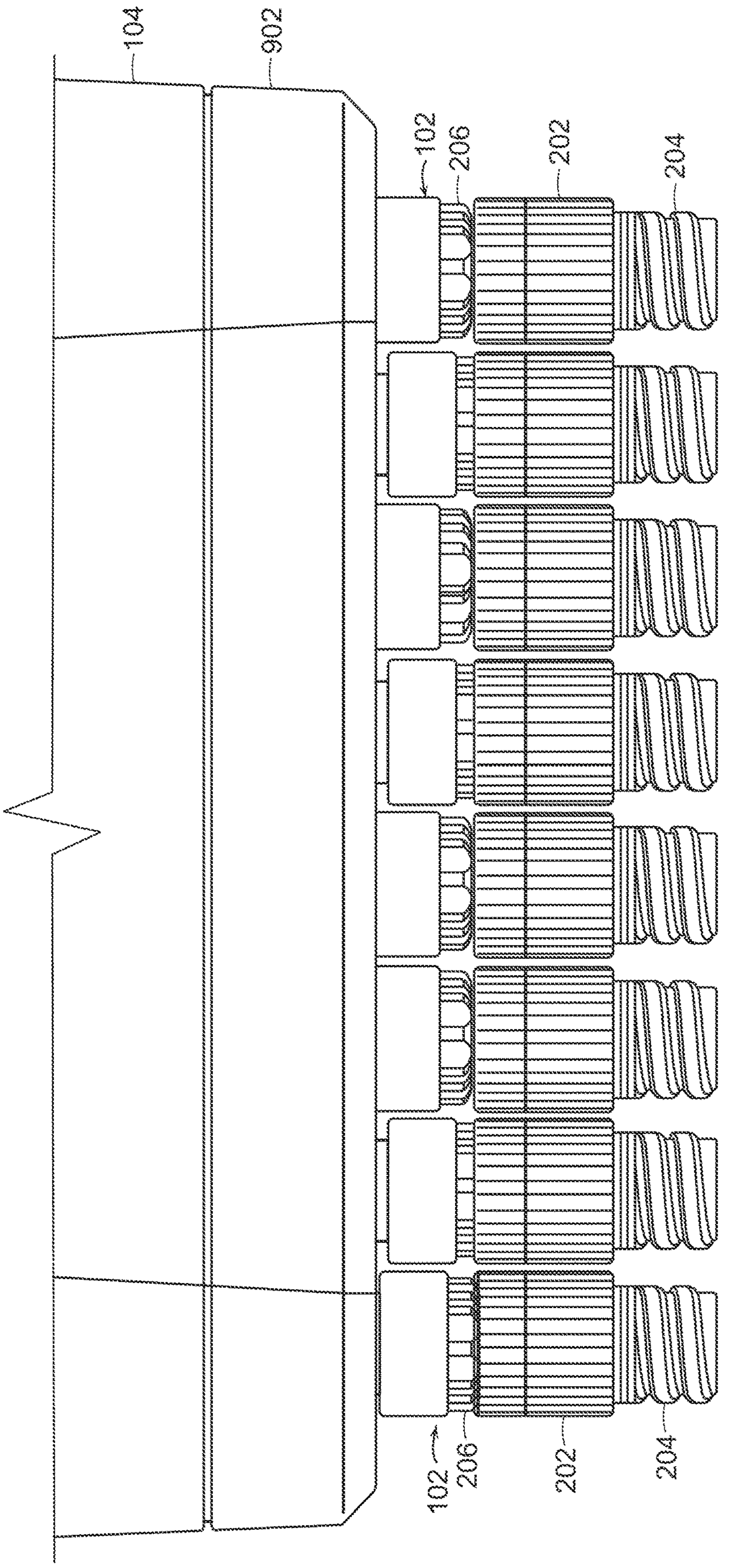
FIG. 14 is a side view of a row of caps at different stages of engagement with a row of cap drivers extending from the hand-held device.

When the handheld device is set against a row of caps 202, the cap drivers 102 may initially rest on the caps as shown at the left due to interference between the rotational features 206 of the cap driver and features 1308 of the cap recess 1310. In that state, the cap driver presses upwardly against the drive hub 1002 which floats upward against the spring 1218. As the cap driver 102 is rotated such that the features allow it to be pressed into the recess of the cap, the force applied by compression spring 1218 presses downwardly against the cap driver to overcome friction, and the cap driver moves into the top recess of the cap as illustrated to the right of FIG. 13. Thus, the floating cap drivers acting against compression springs 1218 allow individual cap drivers to be seated in the cap recesses independently, as the rotational features allow, with no force applied by the user. FIG. 14 shows the eight cap drivers being set into cap recesses at different stages of insertion.

Figure 15:
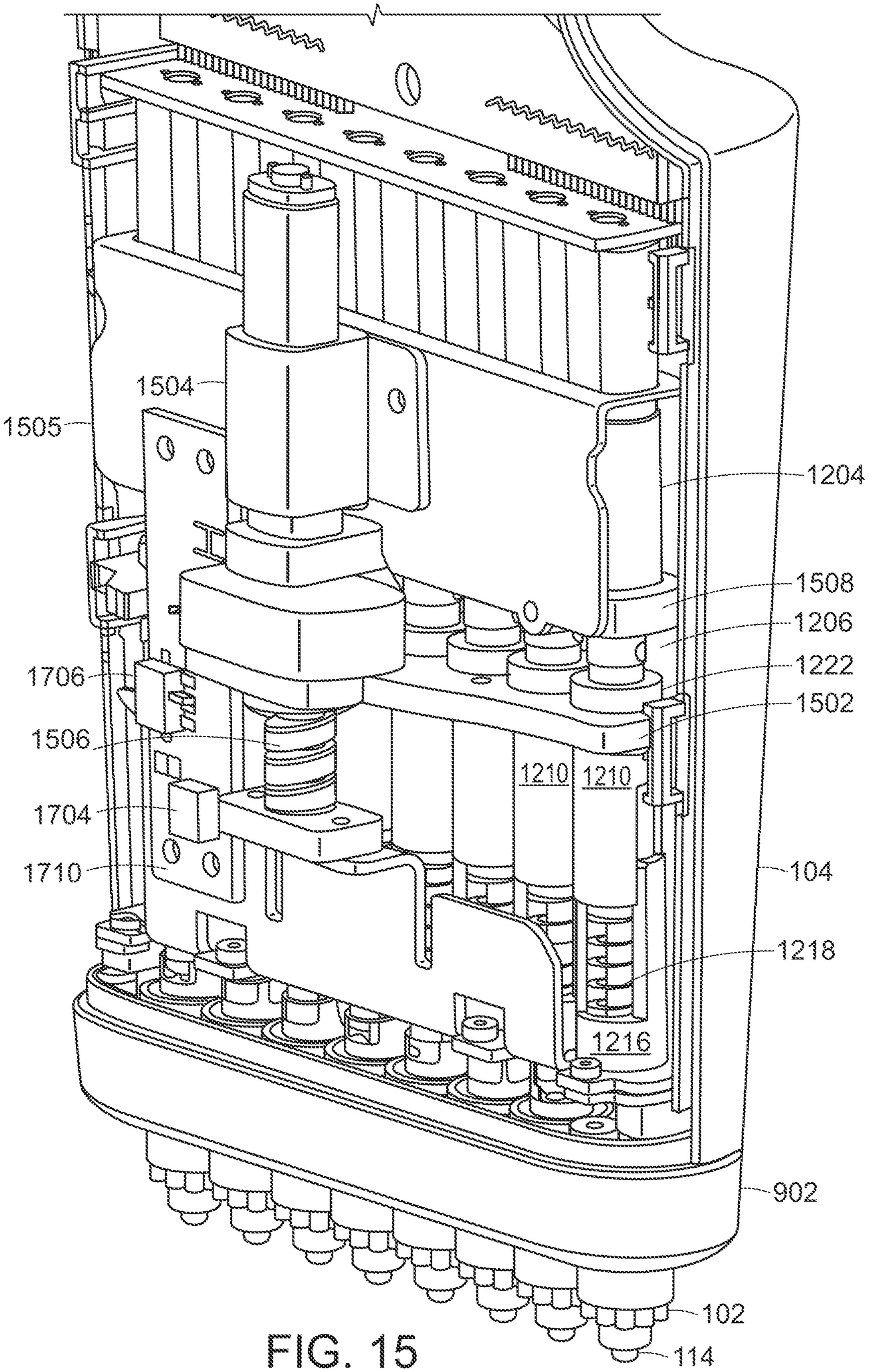
FIG. 15 is a perspective view of the hand-held device with a panel removed to show the motorized rotary drive and motorized linear drive of the device.

FIG. 15 shows the motorized linear drive that drives the ejector pins downwardly to release caps from the cap drivers 102. Each of the flanges 1222 of the ejector hubs 1210 rests on a horizontal drive plate 1502. That drive plate is in turn driven vertically by a rotary motor 1504 through a lead screw 1506. The motor 1504 is fixed to a bracket 1505. As the plate 1502 is driven downward, it contacts the lower surfaces of the grooves 1220 in the ejector hubs 1210, thus driving the ejector pins downward.

The motors 1204 and associated torque splines 1206 are mounted to a fixed bracket 1508. The translation of each ejector hub 1210 relative to the torque spline allows for downward translation of the ejector pins 114 as the motors 1204 remain stationary.

Figure 16:
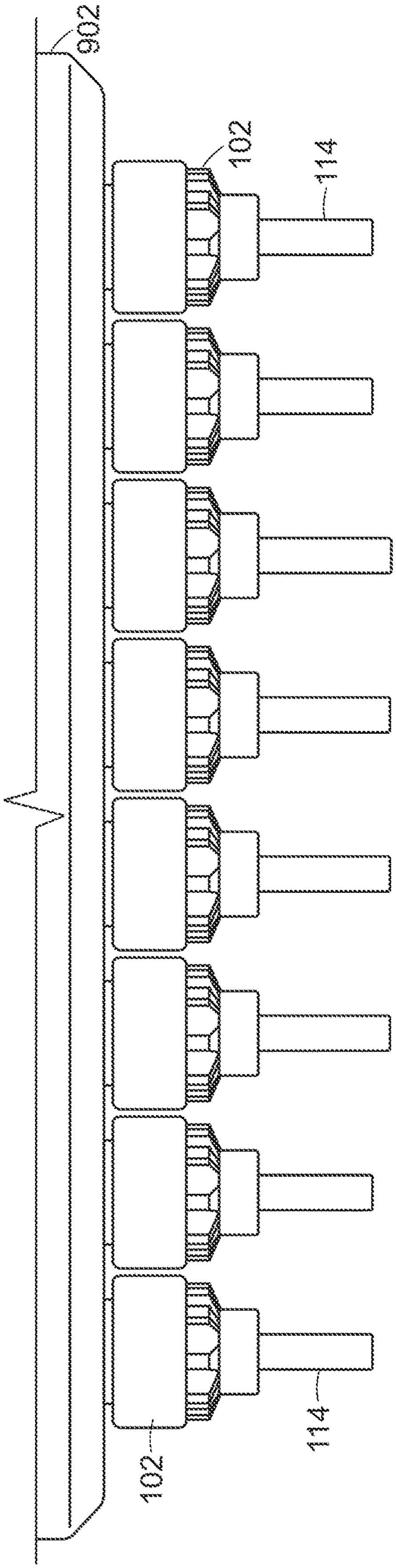
FIG. 16 is a side view of a row of cap drivers with the ejector pins fully extended.

A feature of the device is to stagger ejector pin motion to allow caps to be ejected at different times rather than all at once. Adding an incremental delay in cap ejection start time results in less force required to push the caps out. In the disclosed device, the four caps in the central positions of the array of eight caps are first ejected, and the remaining four caps, two at each end, are only ejected after a delay. With only four caps being ejected initially, the required force is reduced, and the generated momentum is used to push the remaining caps out, leading to even less motor force required to initiate motion of the remaining caps. FIG. 16 illustrates staggered arrangement of the ejector pins during ejection. The four center pins extend further than the two pins on either end throughout the ejection movement.

Figures 17A, 17B, 17C:
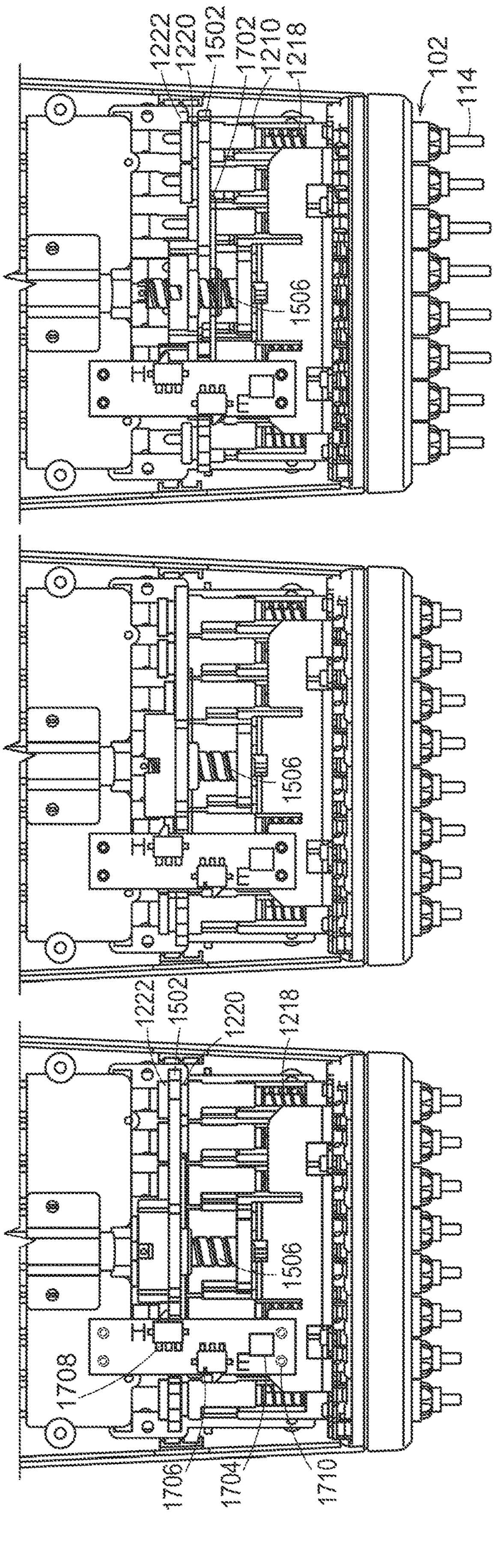
FIGS. 17A-C are side views of the drives of FIG. 15, showing a sequence of ejector pin motion.

FIGS. 17A-C illustrate the mechanism for obtaining the staggered drive. An additional plate 1702 is positioned below the plate 1502 at the four center ejector hubs 1210. FIG. 17A shows the system with ejector pins retracted. When the ejector plate 1502 is moved downward, the additional plate immediately presses the lower surface of the groove 1220 as in FIG. 17B to initiate downward movement of the center four ejector pins. As the ejector plate 1502 is narrower than the groove 1220 of the ejector hubs, the ejector plate only strikes the lower surface of the grooves 1220 of those ejector hubs after a short delay FIG. 17C. Then the end ejector pins are moved down, slightly raised relative to the center pins as shown in FIG. 16.

FIGS. 17A-C also show the controller 1704 and limit switches 1706 and 1708 on a board 1710.

Figure 18B:
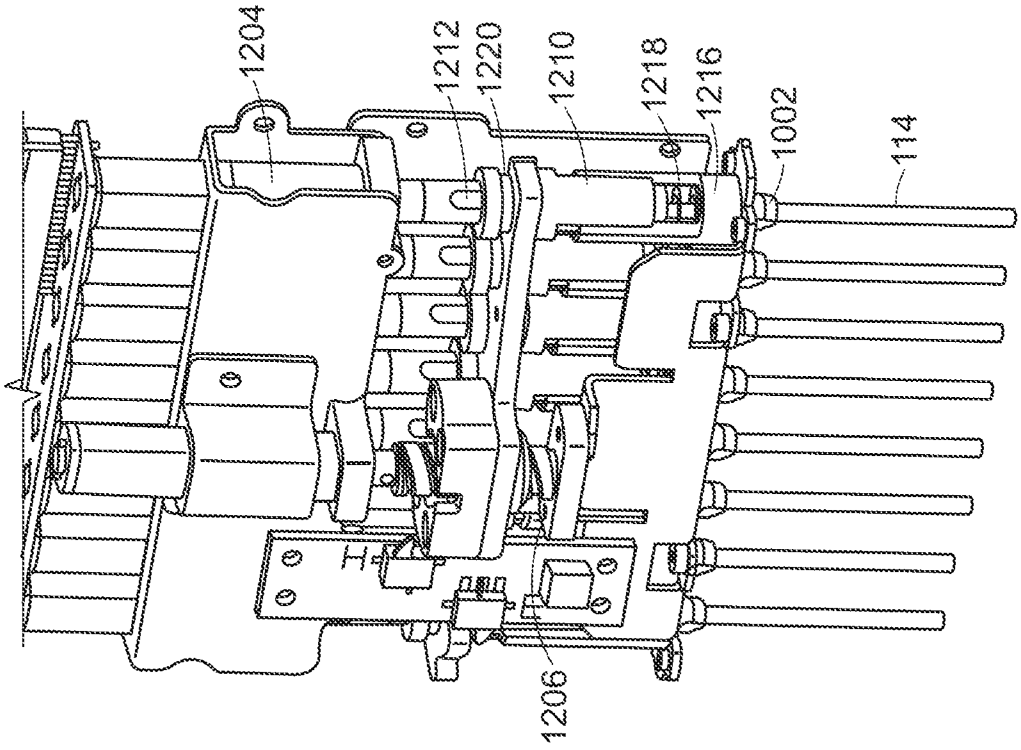
FIG. 18B is a perspective view similar to FIG. 18A but with the ejector pins in the fully extended position.
Figure 18A:
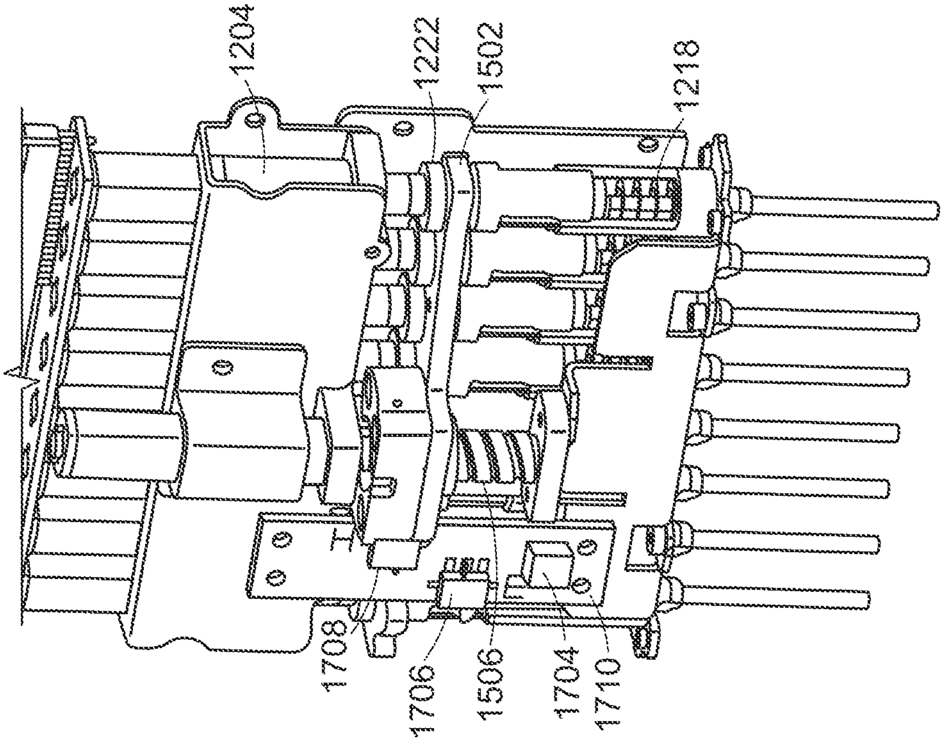
FIG. 18A is a perspective view of the motorized rotary and linear drives with the ejector pins in the retracted position.

FIG. 18A and FIG. 18B showed the system of FIG. 15 in the retracted position (FIG. 18A) and the extended eject position (FIG. 18B). In the retracted position of FIG. 18A, the plate 1502 is in a raised position with the lead screw 1506 fully exposed below the plate 1502. The plate supports all eight of the ejector hub flanges 1222 to retain the ejector pins in raised positions, all at the same height.

In FIG. 18B, the plate 1220 has been lowered by the lead screw 1506, forcing the plate 1702 against the lower surfaces of the grooves 1220 of the center ejector pin hubs and the plate 1502 itself against the lower surfaces of the grooves 1220 of the end ejector pin hubs, lowering the center four ejector pins a small amount further than the two ejector pins at either end of the array. In FIG. 18B, the springs 1218 are compressed, the upper portions of the end grooves 1220 are exposed, and the grooves 1212 in the torque splines 1206 are exposed as the ejector pin has moved downward from the fixed torque spline and motor assembly.

Figure 19A:
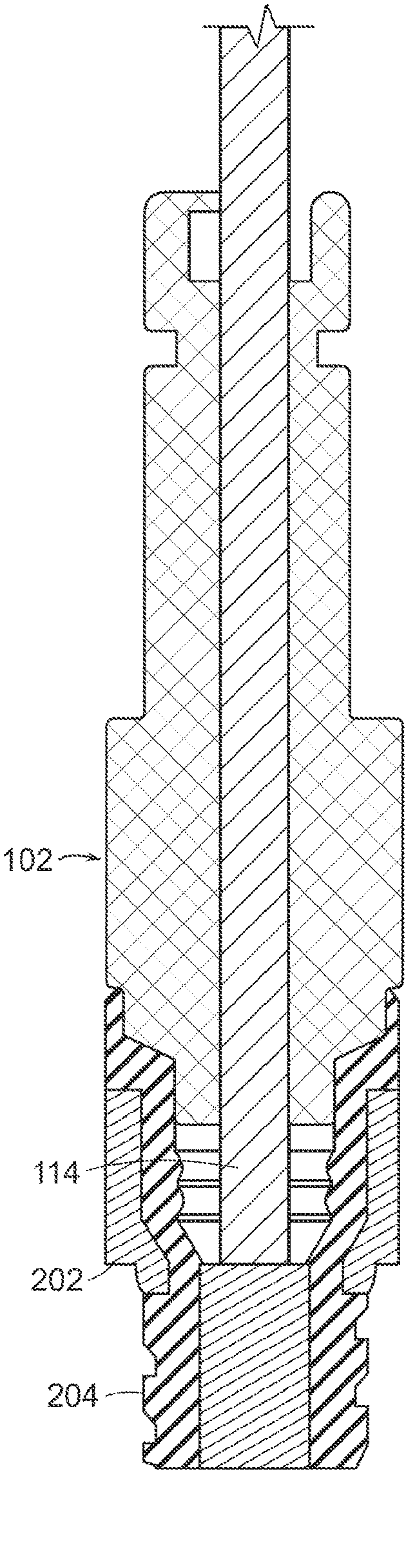
FIG. 19A is a cross-sectional view of a cap on a cap driver with the ejector pin in the retracted position.
Figure 19B:
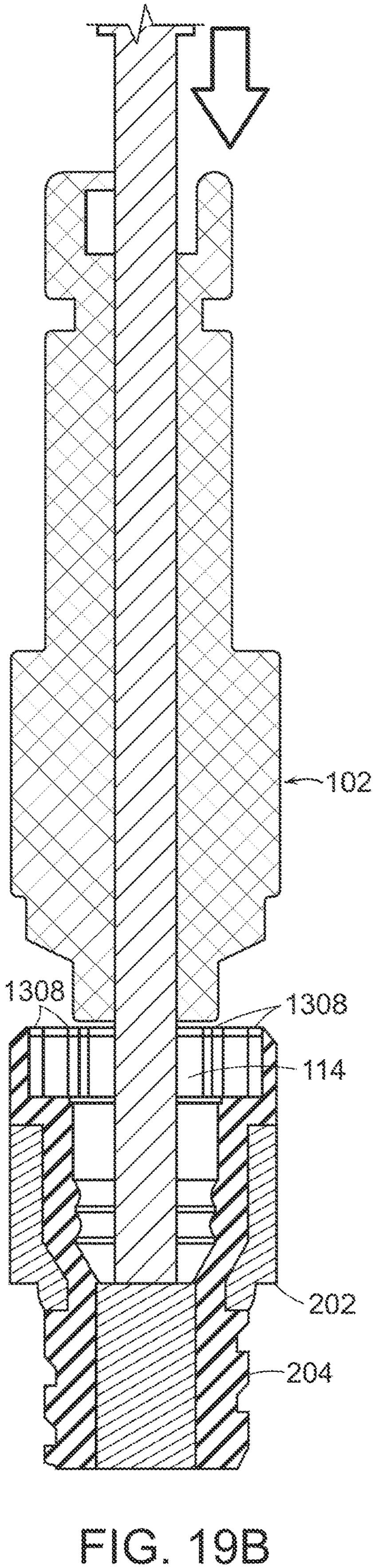
FIG. 19B shows the cap removed from the cap driver with the ejector pin in the fully extended position.

FIG. 19A shows a cap driver 102 seated in the recess of a cap 202 with the ejector spring 114 in a retracted position. In FIG. 19B, the ejector spring 114 has been fully extended to push the cap 202 off of the cap driver 102. Of course, during a capping operation, the cap 102 would be threaded into a sample tube, the ejection releasing the cap driver 102 from the capped tube.

Figures 20A, 20B:
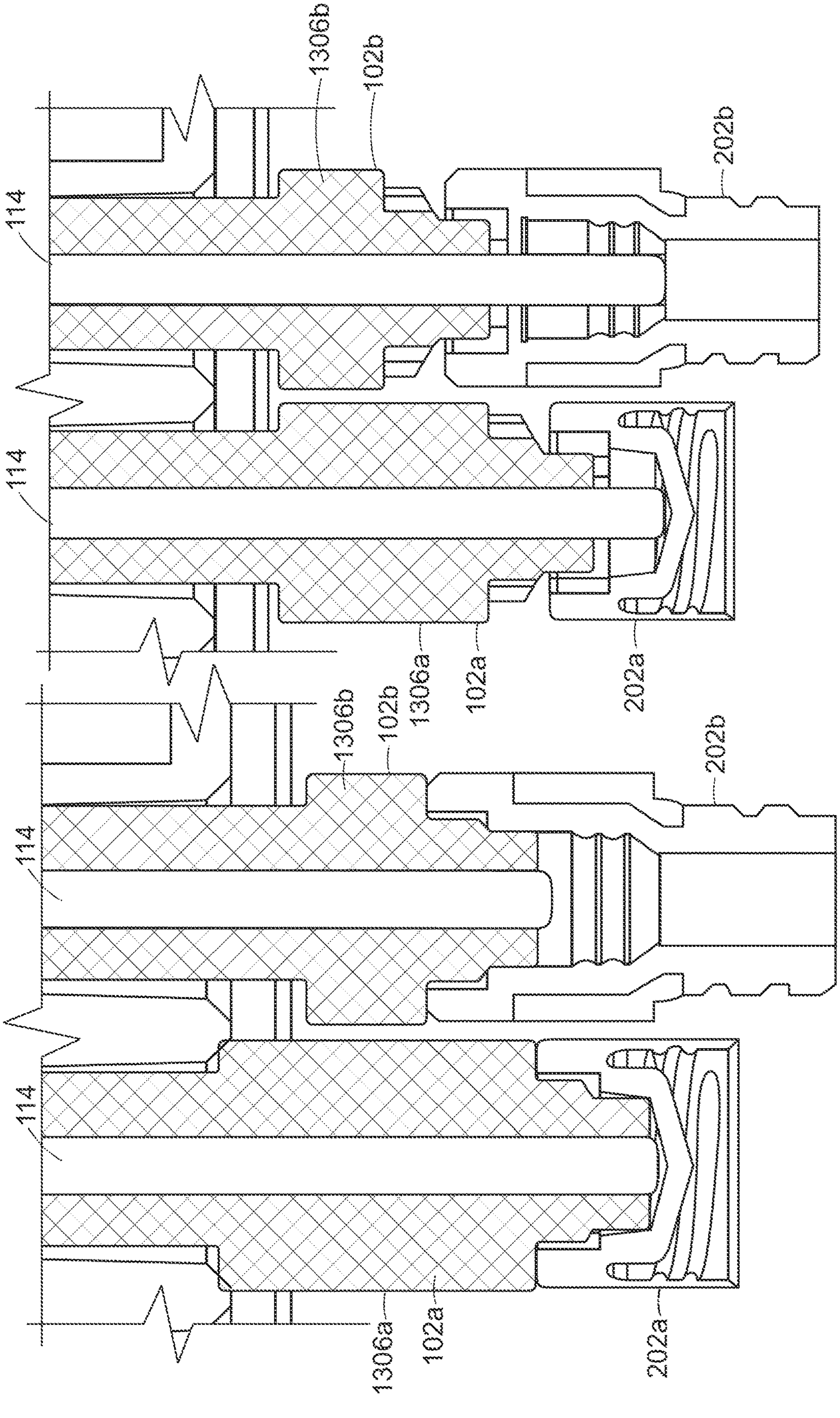
FIG. 20A is a cross-sectional view illustrating adjacent caps of different designs, with different recess depths, with the ejector pins in the retracted position.
FIG. 20B is a cross-sectional view similar to FIG. 20A with the ejector pins in the fully extended position.

The cap drivers 102 are designed to correspond to specific styles of caps. One aspect of that design is that the lower end of the driver below the flange 1306 is properly sized and has appropriate features for a press fit within the cap recess and to properly align with features 1308 in the cap recess. Another aspect of the design is to allow for a fixed length of translation of the ejector pins 114 regardless of the depth of recess. To that end, for caps with shallow recesses as illustrated to the left of each of FIGS. 20A and 20B, the cap driver 102*a* has a longer flange 1306*a*. For a cap with a deeper recess as illustrated in cap 202*b*, a shorter flange 1306*b* is provided. FIG. 20A shows the ejector pins 114 retracted within the fully engaged cap drivers. In FIG. 20B, both pins 114 have been extended the same distance, and each has engaged the bottom of the respective cap recess at the same length of travel even though the cap 202*a* has a much shallower recess than cap 202*b*.

While example embodiments have been particularly shown and described, it will be understood by those skilled in the art that various changes in form and details may be made therein without departing from the scope of the embodiments encompassed by the appended claims.

What is claimed is:

1. A hand-held capper/decapper device comprising:

a housing configured to be held by hand against an array of threaded receptacles;

an array of cap drivers supported by the housing and configured to engage and retain threaded caps;

motorized rotary drive that drives the cap drivers in forward and reverse rotary directions to cap and decap the caps on and from the threaded receptacles;

an array of ejector pins supported by the housing, the ejector pins extending through the cap drivers;

motorized linear drive that drives the ejector pins through the cap drivers to eject caps from the cap drivers; and a motor controller that controls the motorized rotary drive and the motorized linear drive in response to a control button on the housing, the controller configured to control and alternate between a decap function and a cap function with each press of the control button, in the decap function, the motorized rotary drive driving the cap drivers in a reverse rotary direction to decap the threaded receptacles; and in the cap function, the motorized rotary drive driving the cap drivers in a forward rotary direction to cap the threaded receptacles, followed by the motorized linear drive driving the ejector pins through the cap drivers to eject the caps from the cap drivers and then retracting the ejector pins.

2. The hand-held capper/decapper device as claimed in claim 1, further comprising an eject button on the housing, the motor controller responding to press of the eject button to cause the motorized linear drive to drive the ejector pins through the cap drivers, to eject caps from the cap drivers, to then retract the ejector pins, and to then enter a state to perform the decap function with the next press of the control button.

3. The hand-held capper/decapper device as claimed in claim 1, wherein in the decap function, the motorized rotary drive rotates in a forward direction to engage the cap drivers to the caps prior to driving the cap drivers in the reverse rotary direction.

4. The hand-held capper/decapper device as claimed in claim 1, wherein the cap drivers are supported in a cartridge that is removably attached to the housing, the cap drivers engaging the motorized rotary drive through the ejector pins.

5. The hand-held capper/decapper device as claimed in claim 4, wherein the motorized linear drive drives the ejector pins in a single fixed stroke length and the cap drivers in the cartridge are of lengths that complement the caps to control depth of stroke length within the caps.

6. The hand-held capper/decapper device as claimed in claim 4, wherein the cartridge is retained on the housing by magnets.

7. The hand-held capper/decapper device as claimed in claim 1, wherein the cap drivers float vertically against springs.

8. The hand-held capper/decapper device as claimed in claim 1, wherein the motorized linear drive is of a fixed stroke length and the motorized linear drive engages one set of ejector pins prior to another set of ejector pins.

9. The hand-held capper/decapper device as claimed in claim 1, wherein the motorized rotary drive comprises individual rotary motors, each motor coupled to drive a cap driver, and the motorized linear drive comprises a common linear motor that drives all ejector pins.

10. A method of capping/decapping threaded receptacles with a handheld device comprising:

positioning cap drivers on the handheld device against the threaded receptacles;

with a control button on the handheld device, controlling motorized rotary drive of the cap drivers and motorized linear drive of ejector pins supported in a housing through a motor controller, the controller alternating between decap and cap functions and controlling one of the functions with each press of the control button, in the decap function, driving the cap drivers in reverse rotary direction to decap the threaded receptacles, and in the cap function driving the cap drivers in forward rotary direction to cap the threaded receptacles, followed by driving the ejector pins through the cap drivers to eject the caps from the cap drivers and then retracting the ejector pins.

11. The method as claimed in claim 10, further comprising with press of an eject button on the handheld device causing the motorized linear drive to drive the ejector pins through the cap drivers to eject caps from the cap drivers, to retract the ejector pins, and to then enter a state to perform the decap function with the next press of the control button.

12. The method as claimed in claim 10, wherein in the decap function, the motorized rotary drive rotates in a forward direction to engage the cap drivers to the caps prior to driving the cap drivers in the reverse rotary direction.

13. The method as claimed in claim 10 further comprising installing the cap drivers in a cartridge that is removably attached to the housing, the cap drivers engaging the motorized rotary drive in the housing.

14. The method as claimed in claim 13, wherein the motorized linear drive drives the ejector pins in a single fixed stroke length and the cap drivers in the cartridge are of lengths that complement the caps to control depth of stroke length within the caps.

15. The method as claimed in claim 13, wherein the cartridge is retained on the housing by magnets.

16. The method as claimed in claim 10, wherein the cap drivers float vertically against springs.

17. The method as claimed in claim 10, wherein the motorized linear drive is of a fixed stroke length and the motorized linear drive engages one set of ejector pins prior to another set of ejector pins.

18. The method as claimed in claim 10, wherein the motorized rotary drive comprises individual rotary motors coupled to the ejector pins to drive the cap drivers through the ejector pins and the motorized linear drive comprises a common linear motor that drives all ejector pins.

19. A hand-held capper/decapper device comprising:

a housing configured to be held by hand against an array of threaded receptacles;

an array of cap drivers supported by the housing in a removable cartridge and configured to engage and retain threaded caps, the cartridge being retained on the housing by magnets;

an array of ejector pins supported by the housing, the ejector pins extending through the cap drivers;

motorized linear drive that drives the ejector pins through the cap drivers to eject caps from the cap drivers; and motorized rotary drive that engages the cap drivers to drive the cap drivers in forward and reverse rotary directions to cap and decap the caps on and from the threaded receptacles.

20. A hand-held capper/decapper device comprising:

a housing configured to be held by hand against an array of threaded receptacles;

an array of cap drivers supported by the housing and configured to engage and retain threaded caps;

an array of ejector pins supported by the housing, the ejector pins extending through the cap drivers;

individual drive motors configured to rotate the cap drivers in forward and reverse rotary directions to cap and decap the caps on and from the threaded receptacles; and a common linear drive motor that translates the ejector pins through the cap drivers to eject caps from the cap drivers.

21. The hand-held capper/decapper device as claimed in claim 20, wherein the cap drivers are supported in a cartridge that is removably attached to the housing, the cap drivers to be rotated by the individual drive motors.

22. The hand-held capper/decapper device as claimed in claim 21, wherein the common linear drive motor drives the ejector pins in a single fixed stroke length and the cap drivers in the cartridge are of lengths that complement the caps to control depth of stroke length within the caps.

23. The hand-held capper/decapper device as claimed in claim 21, wherein the cartridge is retained on the housing by magnets.

24. The hand-held capper/decapper device as claimed in claim 20, wherein the cap drivers float vertically against springs.

25. The hand-held capper/decapper device as claimed in claim 20, wherein the common linear drive motor is of a fixed stroke length and the common linear drive motor engages one set of ejector pins prior to another set of ejector pins.

26. The hand-held capper/decapper device as claimed in claim 20 further comprising:

an array of ejector pin hubs, each ejector pin hub configured to be rotated by and be axially translatable relative to one of the individual drive motors, each ejector pin hub coupled to rotate a cap driver and coupled between the common linear drive and an ejector pin to translate the ejector pin through the cap driver.

27. A hand-held capper/decapper device comprising:

a housing configured to be held by hand;

an array of drive motors in the housing;

an array of ejector pin hubs, each ejector pin hub configured to be rotated by and be axially translatable relative to a drive motor of the array of drive motors;

an array of ejector pins, each supported by one of the ejector pin hubs;

an array of cap drivers, each configured to be rotated by an ejector pin hub of the array of ejector pin hubs and configured to engage and retain a threaded cap, rotation of the cap drivers in forward and reverse rotary directions enabling capping and decapping of the caps on and from threaded receptacles, the ejector pins extending through the cap drivers; and a common linear drive motor that translates the array of ejector pin hubs to translate the ejector pins through the cap drivers to eject caps from the cap drivers.

28. The hand-held capper/decapper device as claimed in claim 27, wherein the cap drivers are supported in a cartridge that is removably attached to the housing, the cap drivers to be rotated by the array of drive motors through the array of ejector pin hubs.

29. The hand-held capper/decapper device as claimed in claim 27 wherein the cap drivers float vertically against springs positioned between the cap drivers and the ejector pin hubs.

* * * * *